US011823406B1

(12) United States Patent
Wu et al.

(10) Patent No.: US 11,823,406 B1
(45) Date of Patent: Nov. 21, 2023

(54) MOIRÉ-BASED DISTANCE MEASUREMENT SYSTEM

(71) Applicant: MLOptic Corp, Redmond, WA (US)

(72) Inventors: Sophia Shiaoyi Wu, Bellevue, WA (US); Pengfei Wu, Bellevue, WA (US)

(73) Assignee: MLOptic Corp., Redmond, WA (US)

(*) Notice: Subject to any disclaimer, the term of this patent is extended or adjusted under 35 U.S.C. 154(b) by 0 days.

(21) Appl. No.: 18/224,041

(22) Filed: Jul. 19, 2023

(51) Int. Cl.
*G02B 27/60* (2006.01)
*G06T 7/521* (2017.01)

(52) U.S. Cl.
CPC .............. *G06T 7/521* (2017.01); *G02B 27/60* (2013.01)

(58) Field of Classification Search
CPC ....... A61B 6/06; A61B 6/4233; A61B 6/4291; A61B 6/484; A61B 6/4021; G01N 23/041; G01N 2223/1016; G21K 1/025; G21K 1/06; G21K 2207/005; G06T 7/521; G02B 27/60
USPC ...................... 356/4, 138, 614–624, 356, 374
See application file for complete search history.

(56) References Cited

U.S. PATENT DOCUMENTS

| 4,979,827 A * | 12/1990 | Matsui ...................... G01D 5/38 250/237 G |
| 5,991,004 A * | 11/1999 | Wallace ................... G02B 27/60 356/399 |
| 7,385,179 B2 * | 6/2008 | Igaki ......................... G01D 5/38 250/237 G |
| 2004/0046966 A1 * | 3/2004 | Fujita .................. G01B 11/2536 356/604 |
| 2004/0136577 A1 * | 7/2004 | Rao .......................... G06V 10/88 382/128 |
| 2004/0173737 A1 * | 9/2004 | Shimomura ......... G01D 5/34715 250/231.13 |
| 2005/0046873 A1 * | 3/2005 | Suzuki ..................... G06T 7/521 356/605 |
| 2011/0243300 A1 * | 10/2011 | Kaneko ..................... A61B 6/06 378/36 |
| 2019/0279889 A1 * | 9/2019 | Iino ........................ G03F 9/7042 |

* cited by examiner

*Primary Examiner* — Isiaka O Akanbi
(74) *Attorney, Agent, or Firm* — Jong Patent Firm; Cheng Ning Jong; Tracy P. Jong

(57) ABSTRACT

A system for providing an object distance of a device under test (DUT), the system including a first lens, a second lens, an optical pinhole disposed between the first lens and the second lens, a detector and a pair of gratings disposed between the second lens and the detector, the detector configured for receiving a Moiré pattern formed as a result of light from the DUT being disposed through the first lens, the optical pinhole, the second lens and the pair of gratings, wherein the object distance is determined based on the Moiré pattern and one or more properties of the pair of gratings.

13 Claims, 28 Drawing Sheets

| Talbot distances | g1 | 2g1 | 5g1 | 10g1 | 20g1 |
|---|---|---|---|---|---|
| g (mm) | 0.727273 | 1.454545 | 3.636364 | 7.272727 | 14.54545 |
| ∅ (deg) | 0.5 | 1.2 | 3.4 | 7.44 | 15.2 |
| 30g1 | 40g1 | 50g1 | 60g1 | 100g1 | 200g1 | 500g1 |
|---|---|---|---|---|---|---|
| 21.81818 | 29.09091 | 36.36364 | 43.63636 | 72.72727 | 145.4545 | 363.6364 |
| 22.53 | 29.3 | 34.59 | 39.68 | 53.88 | 69 | 80 |

FIG. 23

| Talbot distances | 10g1 | 20g1 | 50g1 | 100g1 | 200g1 | 500g1 | 1000g1 |
|---|---|---|---|---|---|---|---|
| g (mm) | 7.272727 | 14.54545 | 36.36364 | 72.72727 | 145.4545 | 363.6364 | 727.2727 |
| ∅ (deg) | 0.77 | 2.23 | 5.5 | 11.8 | 22.47 | 45.86 | 63.89 |

MOIRÉ-BASED DISTANCE MEASUREMENT SYSTEM

BACKGROUND OF THE INVENTION

1. The Field of the Invention

The present invention relates to a system for measuring object distances. More specifically, the present invention is directed to a system for measuring real and virtual object distances.

2. Background Art

Distance measurement is significant in various fields across a wide range of applications, enabling precise calculations and accurate positioning to provide valuable information for navigation, informed decision making, safety enhancement, and improvements in our daily lives. It facilitates scientific discoveries, industrial advancements, as well as engineering and technological developments. There are many methods available for distance measurements. These include utilizing satellites or global positioning systems (GPS), radio waves, ultrasonic waves, trigonometry, laser and optical imaging to determine distances. Among them, optical methods have many advantages over others in terms of both range and accuracy for distance measurements. Optical measurements have also led to the advancement of optical technologies including precise instrumentation, focus control, imaging, interferometry, optical communications. Some commonly used optical methods for measuring distances are as follows: Laser distance measurement uses laser technology to measure distances. It involves emitting a laser beam and measuring the time it takes for the beam to reflect back to the sensor. By using the speed of light and the time taken, a distance can be determined. It is commonly used in applications such as surveying, mapping and autonomous vehicles. Photogrammetry is a technique that uses photographs or images to measure distances. It involves analyzing images and extracting information such as parallax or known reference points to calculate distances. Interferometry utilizes interference patterns created by light waves to measure distances with high precision. It involves splitting a light beam into two paths, one serving as a reference and the other interacting with the target object. The resulting interference pattern is then analyzed to determine the phase shift, a property which is proportional to a distance. Structured light methods involve projecting a known pattern, such as a grid or a series of lines, onto a target object. A camera or sensor observes the deformation of the pattern caused by the object's surface. By analyzing the deformed pattern, a distance to the object can be determined based on the known geometry of the projected pattern.

Emerging eXtended Reality (XR) including AR (Augmented Reality), VR (Virtual Reality) and MX (Mixed Reality), is one of the enabling applications using the Near Eye Display (NED) technology. The XR technology can create a three-dimensional (3D) representation in a complete virtual environment or a user's physical surroundings, allowing for the accurate placement of virtual objects to create a sense of virtual distance (VD) which is the perception of distance between two objects or locations in a virtual or augmented environment. The accuracy of a VD is critical important in implementing XR applications as well as NED technologies because it plays a crucial role in consistently creating but not breaking a sense of immersion and presence in the virtual environment or among the virtual objects and actual physical surroundings. For instance, in AR, the VD refers to the apparent distance between the user and the augmented object or scene. If an AR device places a virtual object on a table in front of the user, the VD should be consistent with the actual distance between the user and the table. If the VD is too far or too close, it can break the illusion of the augmented scene and make it difficult for the user to interact with the virtual object in a natural way.

In VR, a VD refers to the distance between the user and a virtual object or scene within the virtual environment. The VD should be consistent with the user's expectations based on his or her real world experiences. If the user is walking through a virtual forest, the VD between a tree and the user should be similar to the distance between a tree and the user in the real world. If the VD is incorrect, it can cause discomfort or even motion sickness in the user and break the sense of immersion in the virtual environment.

The VD is also critically important in head-up display (HUD) technology, which is a type of display that presents information or graphics to the user in their field of view without obstructing the user's view of the real world. Unlike the XR or NED applications, a HUD image is viewable by one or both eyes and thus comes with much long eye relief. In HUDs, the VD refers to the perceived distance between the displayed information and the user's eyes. If the VD is too far or too close, it can make it difficult for the user to read or process the information quickly and accurately. In certain situations, such as driving or flying, HUDs are designed to provide important information in real time to improve situational awareness and reduce the need for the user to look away from the task at hand. In these cases, accurate and consistent VD is critical to ensure that the displayed information is integrated seamlessly into the user's perception of the real world and does not distract or disorient the user. Therefore, in HUD technology, the VD plays a crucial role in providing information effectively and without disrupting the user's attention or perception of his or her surroundings.

The VD is created by using advanced optics, sensors and computer vision algorithms. Optics quality, sensor size, optical alignment as well as manufacturing tolerances may not be perfect. Small errors can cause large changes of the VDs, especially for AR/VR applications due to the high sensitivity nature of the devices which contain various highly integrated nano optics and micro devices with mechanical tolerances from nanometers to micrometers. Incorrect VDs produce inaccuracies replicated in the real world due to the wrong distance perception between realistic and immersive virtual environments. This will affect significantly the user experience and sense of immersion.

New techniques to precisely measure the object distance are critical to ensure accurate project virtual images and to create a seamless and immersive AR or VR experience for the user. In the real world, we use physical cues like size, depth, and perspective to estimate distances. However, in virtual environments, these cues may not exist or may be altered, making it difficult to accurately judge distances. Optical apertures in XR devices are normally small with several millimeters in diameter to match our human eye pupil. As such, conventional optical imaging methods are limited by the depth of field and cannot precisely detect an object position especially when the object is at a distance. Also, other techniques based on time of flight including lidars, ranger finders and structured light detections, etc., are not suitable for distance measurements of virtual objects.

There exists a need for a new technique to precisely measure VDs to ensure accurate projections of virtual images and to create a seamless and immersive AR or VR experience for users. In the real world, humans use physical cues, e.g., size, depth, and perspective to estimate distances. However, in virtual environments, these cues may not exist or may be altered, making it difficult to accurately judge distances. For example, in AR and VR applications, the devices come in different sizes and resolutions, which can affect the perceived distance. A smaller display may make objects appear closer than they are while a larger display may make them seem farther away.

There exists a need for a method or system suitable for providing large VD measurements, using a small aperture, e.g., of only 3 mm, of a device under test as compared to prior art equipment capable of providing acceptable VD measurements, e.g., of less than 2 m, e.g., by using an optical imaging camera used in metrological tests of XR products.

SUMMARY OF THE INVENTION

In accordance with the present invention, there is provided a system for providing an object distance of a device under test (DUT), the system including:
(a) a first lens;
(b) a second lens,
(c) an optical pinhole disposed between the first lens and the second lens;
(d) a detector; and
(e) a pair of gratings disposed between the second lens and the detector, the detector configured for receiving a Moiré pattern formed as a result of light from the DUT being disposed through the first lens, the optical pinhole, the second lens and the pair of gratings, wherein the object distance is determined based on the Moiré pattern and one or more properties of the pair of gratings.

In one embodiment, the pair of gratings is a pair of Ronchi gratings. In one embodiment, one or more properties of the pair of gratings include a fringe shift (h), a gap (g) between the pair of gratings, a perpendicular displacement (p) of the pair of gratings to one another, a pitch (d) of the pair of gratings and a relative angle of incline ($\alpha$) of the pair of gratings. In one embodiment, the object distance is a real object distance. In another embodiment, the object distance is a virtual distance (VD). In one embodiment, the determining step includes determining the object distance according to formula $r=g/(2 \tan \phi \tan \alpha)$, wherein r=object distance, $\phi$=angle of rotation of Moiré fringes, $\alpha$=relative angle of incline of the pair of gratings and g=gap between the pair of gratings. In one embodiment, the determining step includes determining the object distance according to formula $D/(2 \tan \Delta\theta)$, wherein D=the diameter of the detection system of the detector and $\Delta\theta$=beam divergence angle.

An object of the present invention is to provide a system suitable for providing a real object distance of a DUT.

Another object of the present invention is to provide a system suitable for providing a VD of a DUT.

Another object of the present invention is to provide a system suitable for providing a real object distance or a VD of a DUT that is insensitive to the wavelength of a light source used in the test.

Another object of the present invention is to provide a system suitable for providing a real object distance or a VD of a DUT that is insensitive to the coherency of a light source used in the test.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 23 is a table depicting correlating Talbot distances, gaps g between two gratings and Moiré fringe rotation angles ϕ where the object distance is 1.5 m.

PARTS LIST

Figure 1:
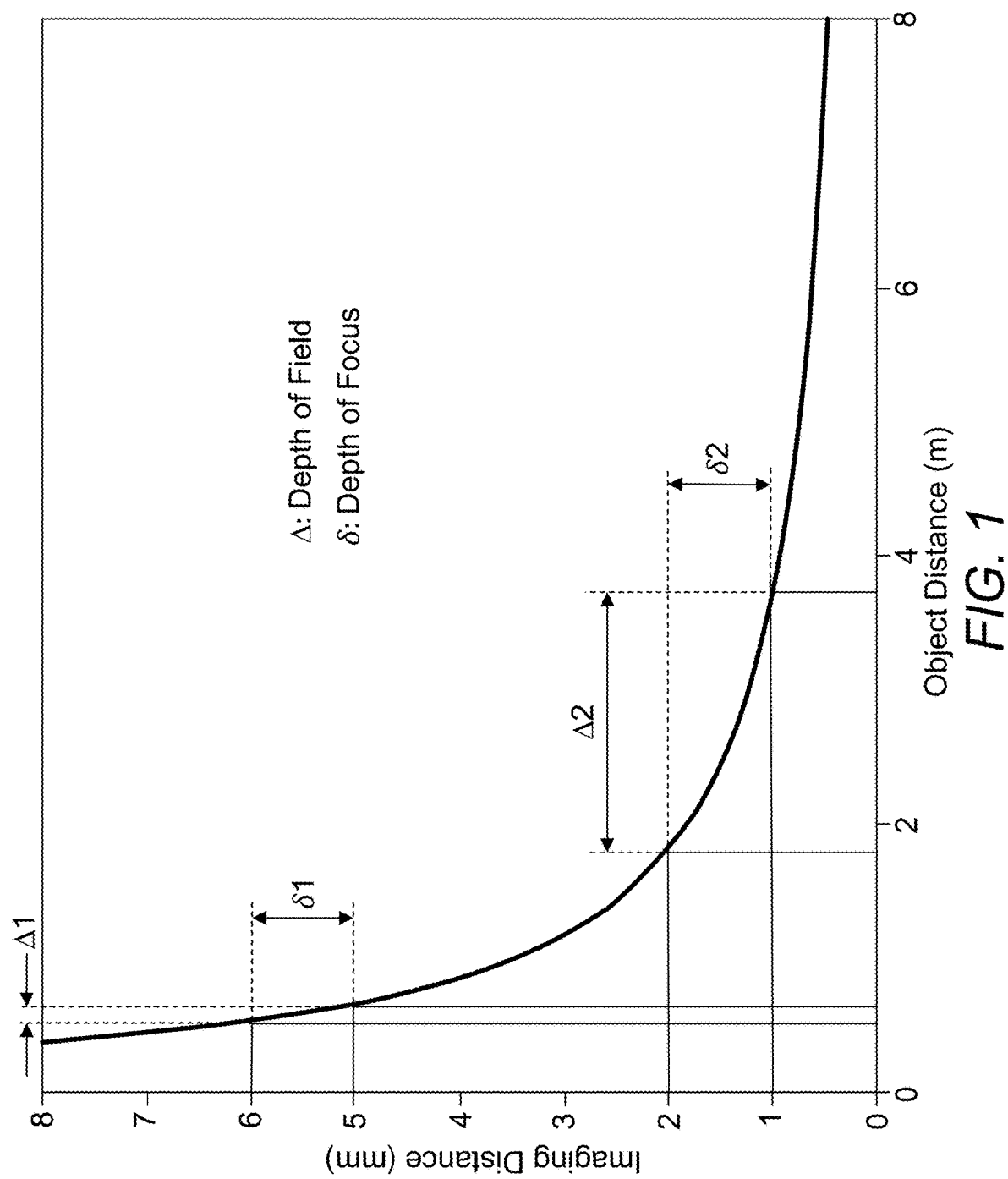
FIG. 1 is a chart depicting imaging distances with respect to object distances.

2—system
4—device under test (DUT)
6—first lens
8—optical pinhole
10—second lens
12—gratings
14—detector
16—holographic waveguide
18—extended reality (XR) glass
19—aperture size
20—imaging lens
22—real object distance or virtual distance
24—depth of field
26—depth of focus
28—circle of confusion
30—example of light engine or microdisplay for XR applications
32—position at which display panel or surface is disposed
34—position at which display panel or surface (for other VD or misaligned) is disposed
36—aperture
38—projection optics
40—Moiré pattern
42—gap between pair of gratings Particular Advantages of the Invention Moiré deflectometry merely requires a highly collimated beam and therefore presents an advantage compared to interferometry, which uses coherency to measure phase shifts produced by the object under observation.

A further advantage of moiré deflectometry when compared to interferometry is that of mechanical stability. In interferometry, a test beam is compared with a reference beam, therefore the mechanical stability of the equipment involved is about less than a quarter of the wavelength of light (lambda) to achieve good contrast and visibility of the interference fringes. On the other hand, Moiré deflectometry requires mechanical stability that is better than a fraction of the period of a grating.

Another important practical advantage is that the sensitivity of Moiré deflectometry is easily varied by changing the separation between the gratings or the period of the gratings. This is very useful for some applications where interferometry does not provide sufficient resolution or in some cases that the fringe shifts are easily confused or simply too great to be resolved.

Furthermore, spatial filtering in the Fourier plane significantly enhances the fringe contrast since it blocks unnecessary optical rays from other directions and it can also be used to select a region of interest on the target, such as a pixel of a microdisplay, a bright spot on an object or a narrow field of view.

The use of Moiré deflectometry offers the most precise measurements compared to other methods including imaging systems, ultrasonic techniques, laser rangefinders and lidars. The present method or system offers the capability of long distance measurements using small apertures which are difficult to obtain by using other optical imaging methods. The use of Moiré deflectometry also provides variable sensitivities which is important for various applications of distance measurements where interferometry does not work. Further, Moiré deflectometry works for both narrow band (or coherent) and broadband (or incoherent) light sources. Further, a system incorporating Moiré deflectometry can be fabricated in a compact and simple manner without numerous vibration sensitive parts. The system can therefore be vibration resistant. Further, accurate distance calculations can be performed with only simple mathematical equations.

Most methods of wavefront measurement including Interferometers need coherent light sources such as narrow band wavelength stabilized lasers. The present system and method based on Moiré deflectometry is a noncoherent optical method useful to precisely measure the object at a distance with small aperture that can rely upon noncoherent light sources. In addition, it is also capable to detect virtual distances for current applications in eXtended Reality (XR), Near Eye Display (NED) and head-up display (HUD).

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
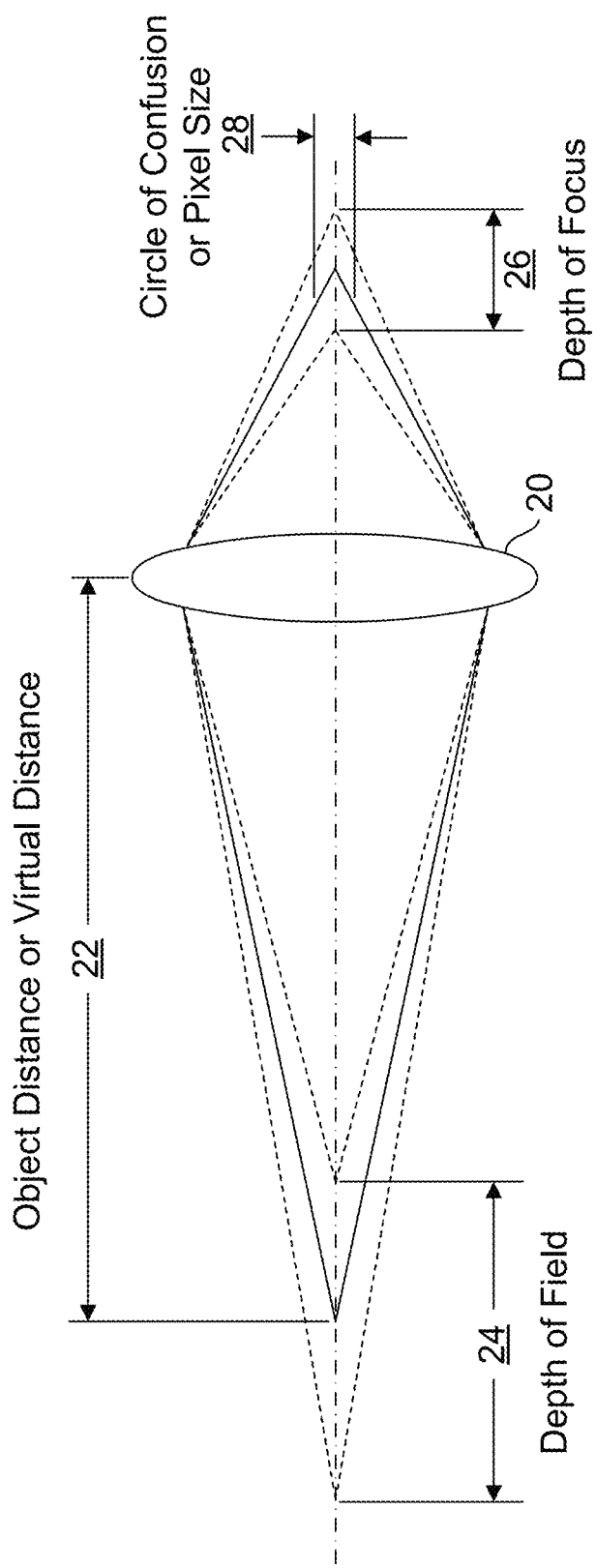
FIG. 2 is a diagram illustrating a standard optical imaging system in which the depth of field on the object side is related to the depth of focus on the image side.
Figure 3:
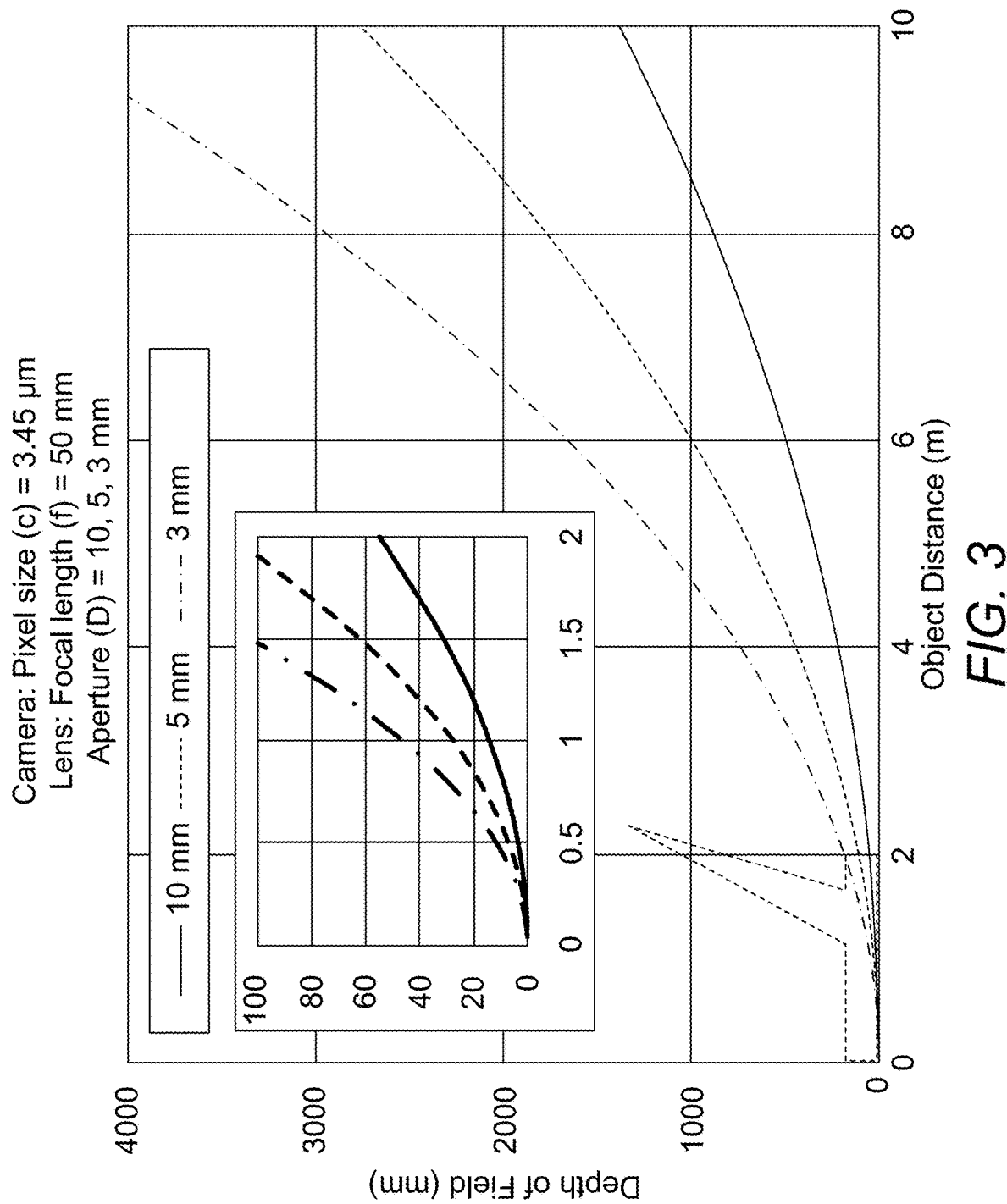
FIG. 3 is a chart depicting the depths of field with respect to object distances of an imaging lens.
Figure 4:
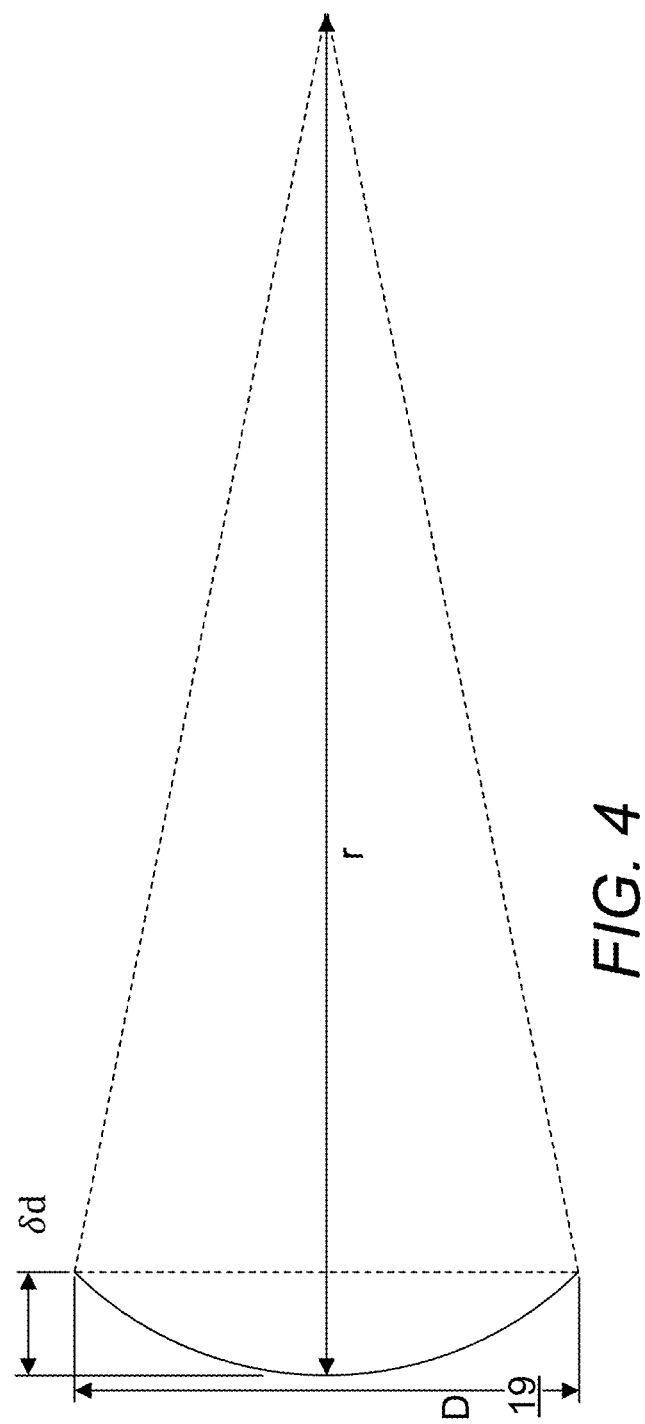
FIG. 4 is a diagram depicting limitations of the use of an imaging lens to provide virtual distances (VDs) where a wavefront change becomes unmeasurable by the lens when a VD is too long.

FIG. 1 is a chart depicting imaging distances with respect to object distances. FIG. 2 is a diagram illustrating a standard optical imaging system in which the depth of field on the object side is related to the depth of focus 26 on the image side. FIG. 3 is a chart depicting depths of field with respect to object distances of an imaging lens. Due to the laws of physics and technical challenges, it is very difficult to precisely measure an object distance with small optical apertures. VDs of an extended reality (XR) device are normally measured by using optical imaging cameras used in metrological tests of XR products, e.g., those capable of obtaining Modulation Transfer Function (MTF), boresight and color imaging measurements. However, with the increase of an object distance or VD 22, the depth of field 24 becomes larger for an imaging lens 20, resulting in large uncertainty of the distance measurement. For this reason, the imaging lens is only good for very short distance measurements. Referring to FIG. 2, the approximate depth of field (DOF) 24 can be determined using the following formula:

$$DOF=(2r^2c)/(fD)$$

where r is a given object distance, c is the pixel size 28 of the imaging camera, f is the focal length and D is the aperture size 19. Due to the DOF, an object distance measurement has a large uncertainty, especially for a long object distance. The DOF of an imaging lens refers to the range of distances in a scene that appears acceptably sharp in the resulting image. Specifically, it refers to the distance between the nearest and farthest objects in a scene that appears in sharp focus. The DOF is affected by several factors, including the aperture of the lens (the size of the opening through which light enters the lens), the distance between the lens and the subject, and the focal length of the lens. A smaller aperture, a smaller f and a longer object distance will typically result in a deeper DOF, while a larger aperture and a longer focal length will result in a shallower DOF. FIG. 4 is a diagram depicting limitations of the use of an imaging lens to provide real object distances or virtual distances (VD) in extended reality (XR) applications. With a long object distance r, a wavefront change 8*d* is very small, especially with small aperture size D.

$$\delta d \approx (D/2)*\tan(a\tan(D/(2r))) = D^2/(4r)$$

For example, to measure an object distance of 10 meter away, the wavefront change is only 0.225 μm for a 3-mm aperture lens. This is also the main reason the imaging lens has such a large uncertainty to measure VDs in XR applications.

In XR metrology, an imaging lens aperture is normally disposed at about 2-5 mm in diameter in order to match the human eye pupil size. A small aperture further extends the depth of field 24 and thus significantly increasing VD measurement errors, making the imaging method impractical for long VD measurements. For example, to measure a 1.5 m VD, the measurement uncertainty is as large as 100, 60 and 30 mm when using an aperture of 3, 5 and 10 mm, respectively.

Interferometry is one of the effective techniques to precisely measure small wavefront variations when an object to be measured is disposed at a distance. For example, a lens with 3 mm aperture may measure 1.5 m in object distance with about 0.1 mm accuracy. For longer distances (>1.5 m), the measurement will quickly become unacceptable.

In addition to real object positioning and distance measurement, the present method can be used for any devices or systems that produce virtual images, including, but not limited to, a light engine, a near-eye display, a holographic projector, a holographic waveguide, a head-up display (HUD), a naked eye 3D TV, full AR/VR/MR glasses and systems and a display module.

Moiré interferometry is used to measure deformations and displacements in structures by observing the interference pattern created by two or more superimposed gratings. The technique involves creating a replica grating on the object surface and superimposing it with a reference grating. When the object undergoes deformation or displacement, the interference pattern between the two gratings changes, allowing the measurement of the deformation or displacement.

In order to measure angular deviation, it is necessary to know the shift of the fringe pattern given an incident angle. A shift is produced when the two gratings are displaced with respect to one another and, therefore, when the incident beam enters with a certain angle with respect to the gratings, the shadow of the Moiré pattern will be displaced.

Figure 5:
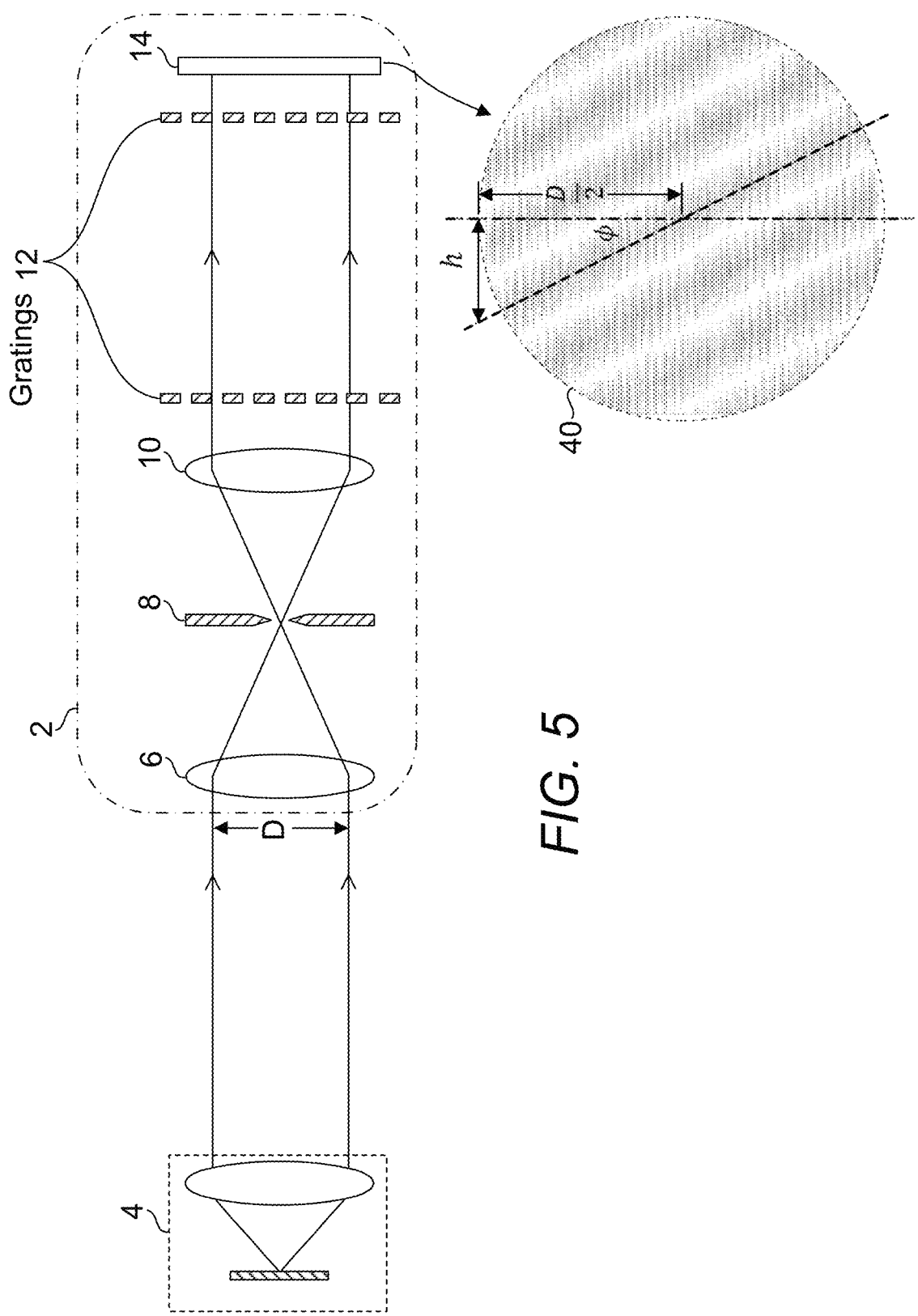
FIG. 5 is a side view of a system useful for measuring object distances of a device under test (DUT).
Figure 6:
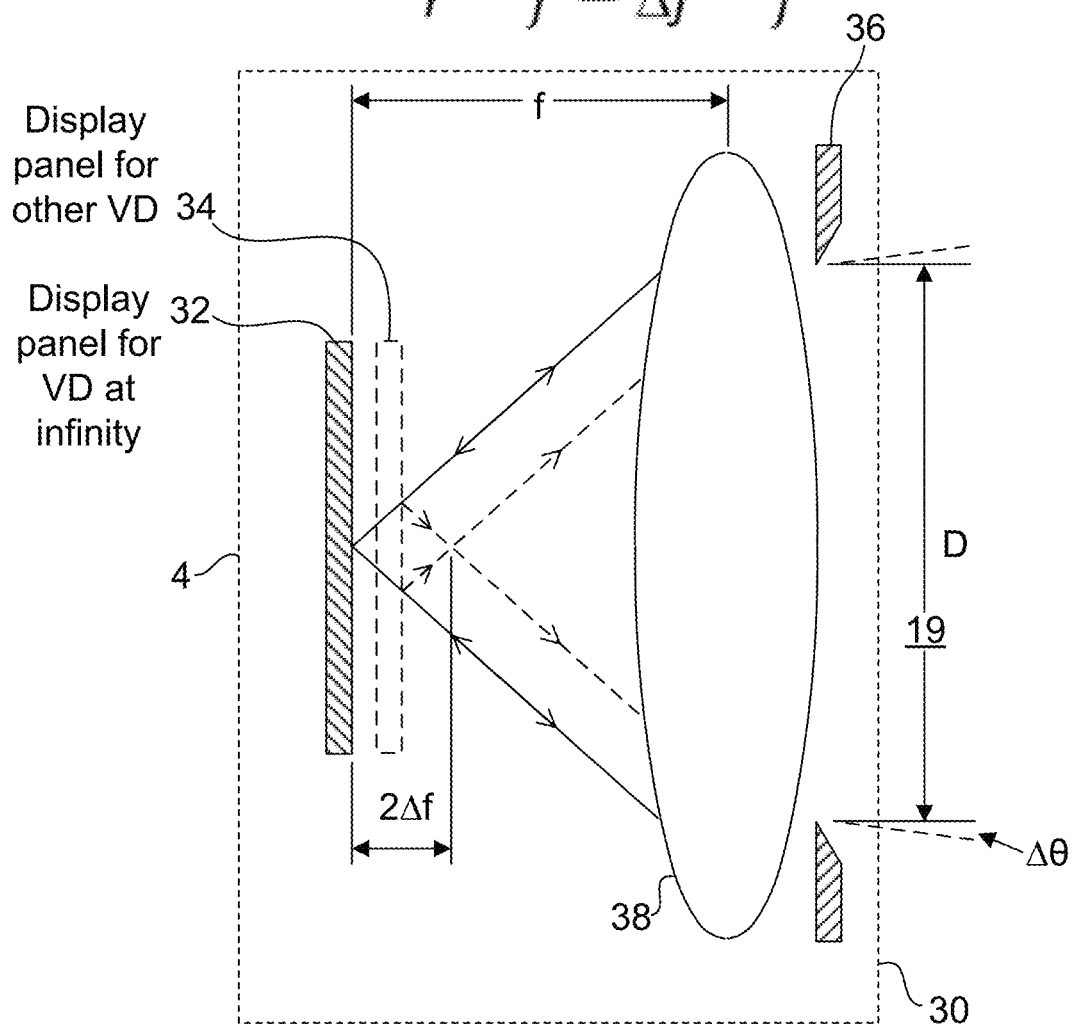
FIG. 6 is a diagram depicting a microdisplay panel wherein misalignments can be determined.
Figure 7:
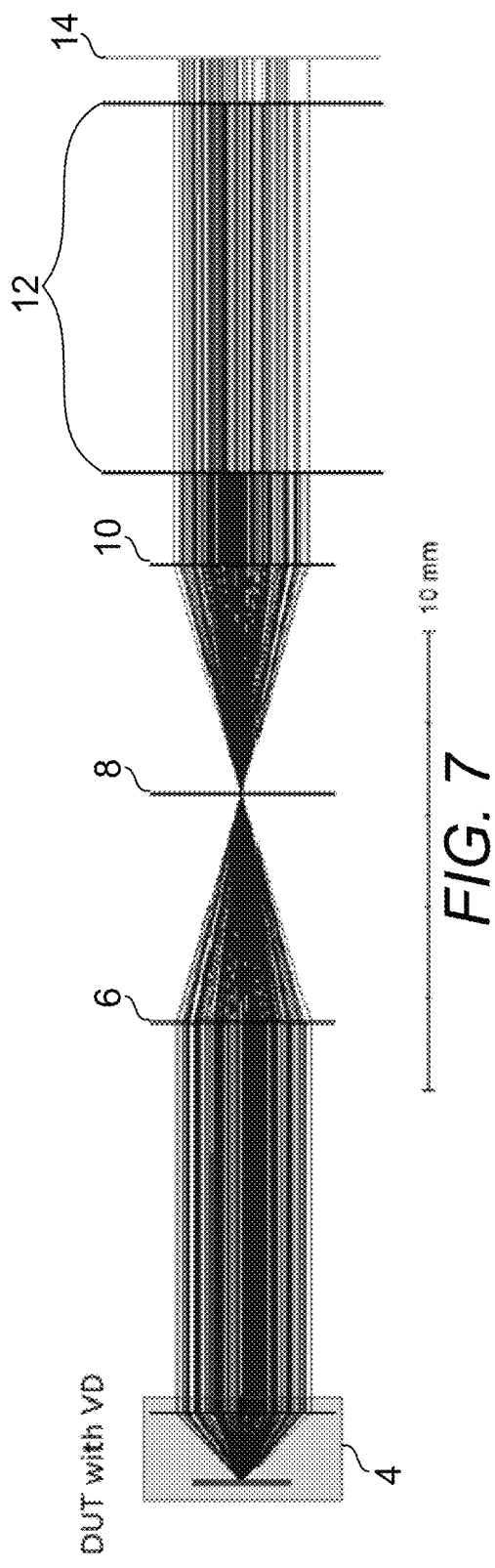
FIG. 7 is a side view of a simulation of a system useful for measuring VDs of a DUT.
Figure 8:
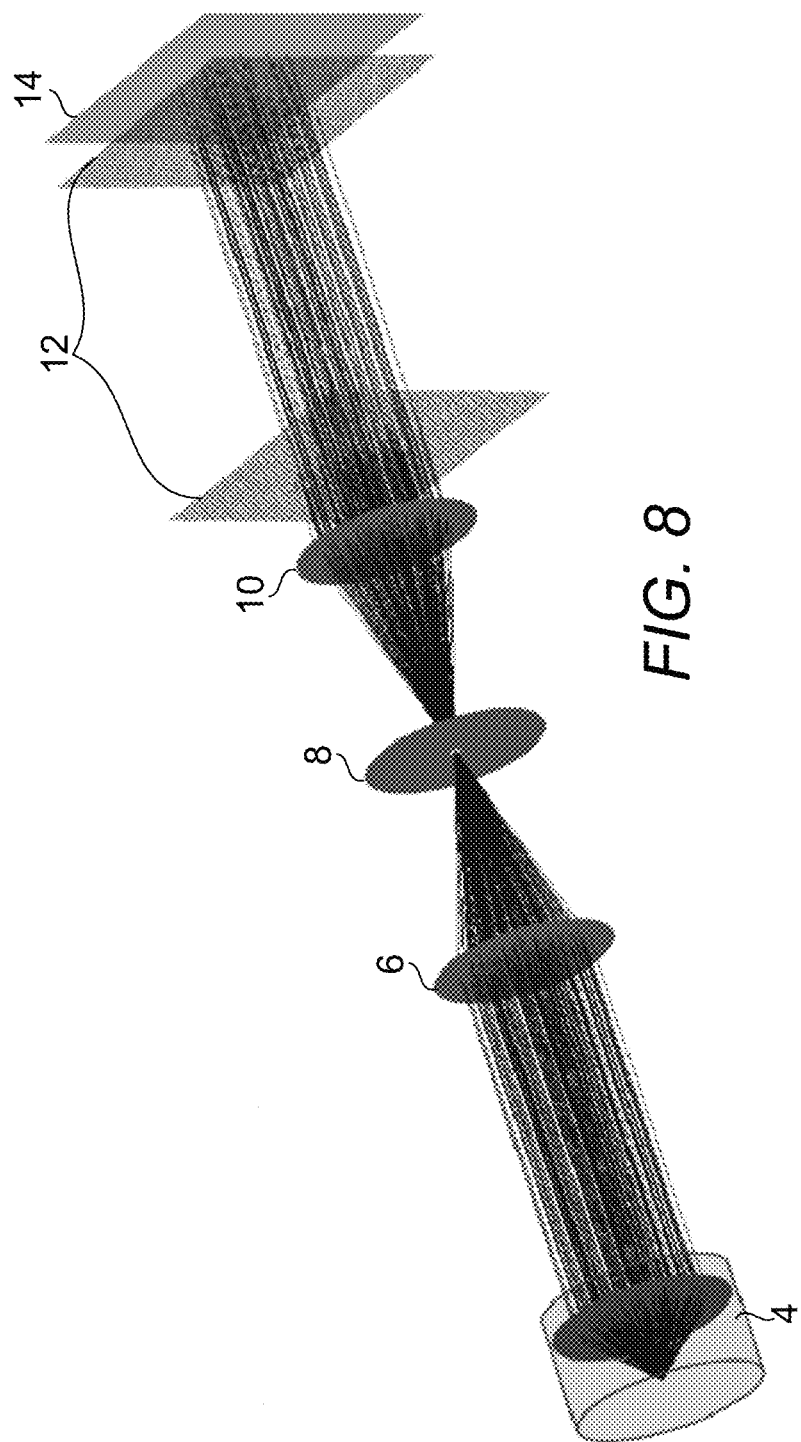
FIG. 8 is a top perspective view of a simulation of a system useful for measuring VDs of a DUT.
Figure 9:
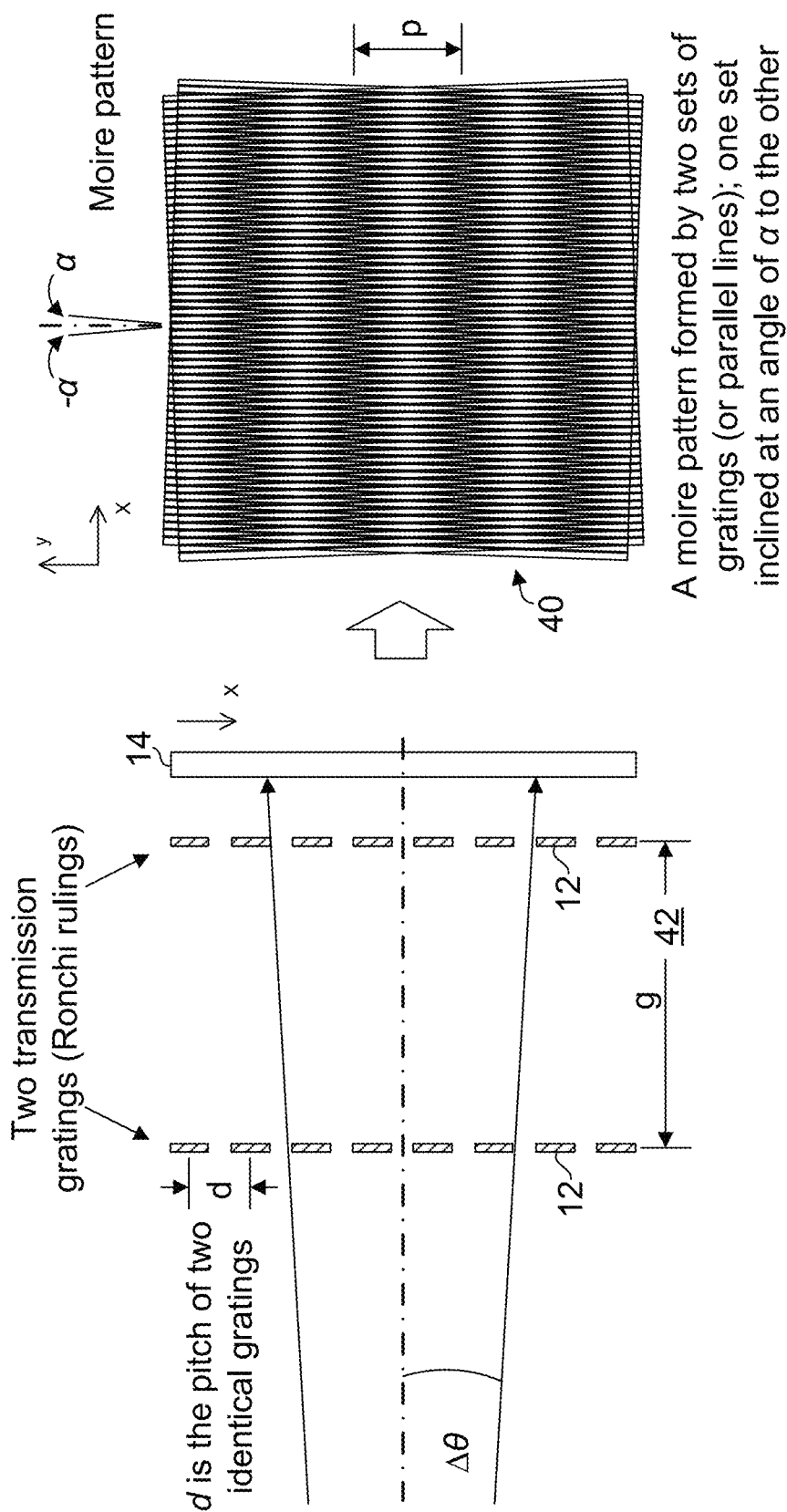
FIG. 9 is a partial side view of a system useful for measuring object distances, depicting a pair of gratings and a Moiré pattern as detected by a detector for measuring object distances.
Figure 10:
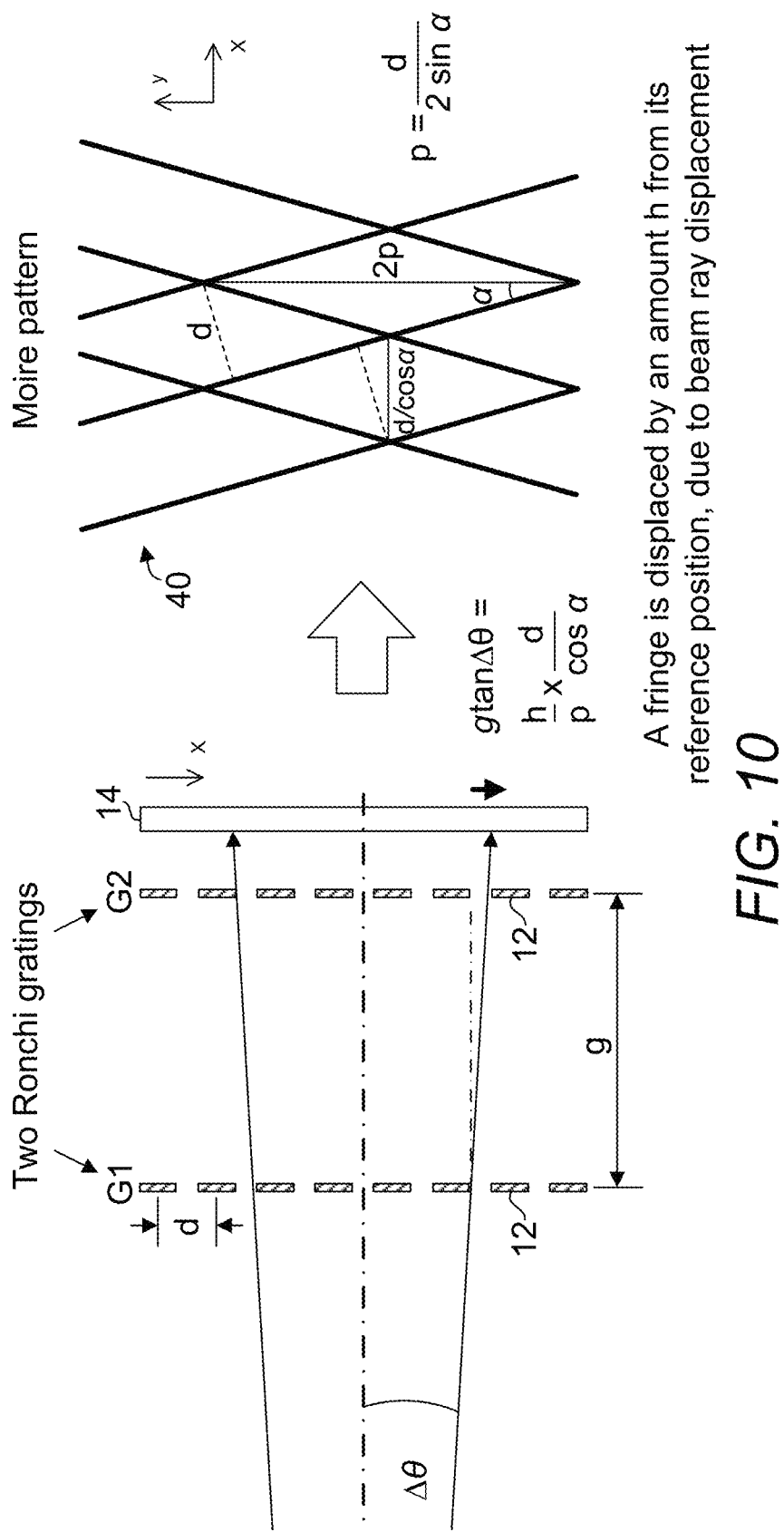
FIG. 10 is a partial side view of a system useful for measuring object distances, depicting a pair of gratings and a Moiré pattern as detected by a detector for measuring object distances with a detailed view of a portion of the Moiré pattern.

FIG. 5 is a side view of a system useful for measuring object distances of a device under test (DUT). FIG. 6 is a diagram depicting a microdisplay panel wherein misalignments can be determined. Any wavefront aberrations are also inherently corrected when a misalignment has been corrected. FIG. 7 is a side view of a simulation of a system useful for measuring VDs of a DUT. FIG. 8 is a top perspective view of a simulation of a system useful for measuring VDs of a DUT. FIG. 9 is a partial side view of a system useful for measuring object distances, depicting a pair of gratings and a Moiré pattern as detected by a detector for measuring object distances. FIG. 10 is a partial side view of a system useful for measuring object distances, depicting a pair of gratings and a Moiré pattern as detected by a detector for measuring object distances with a detailed view of a portion of the Moiré pattern. The system includes a first lens 6, a second lens 10, an optical pinhole 8 disposed between the first lens 6 and the second lens 10, a detector 14 and a pair of gratings 12 disposed between the second lens 10 and the detector 14. The detector 14 is configured for receiving a Moiré pattern 40 formed as a result of light from the DUT 4 being disposed through the first lens 6, the optical pinhole 8, the second lens 10 and the pair of gratings 12. The light can be a light source or simply reflected light off the DUT 4. In one embodiment, the pair of gratings is a pair of Ronchi gratings. A portion of a Moiré pattern is disclosed herein to show various parameters of a Moiré pattern useful for calculating an object distance. It shall be noted that the optical pinhole 8 is useful for selecting rays spatially. The first lens 6 and second lens 10 which straddle the optical pinhole 8 cause collimated rays to be cast through pair of gratings 12 onto the detector 14. Several properties of the pair of gratings include a fringe shift (h), a gap 42 (g) between the pair of gratings, a perpendicular displacement (p) of the pair of gratings to one another, a pitch of the pair of gratings (d) and a relative angle of incline (α) of the pair of gratings, are useful for determining the object distance.

Here, the beam divergence can be obtained by:

$$\tan\Delta\theta = hd/(pg*\cos\alpha)$$

where h is the fringe shift; p is the perpendicular displacement of the gratings to one another, d is the pitch of two identical gratings, a is the relative angle of incline of the pair of gratings and Δθ is the beam divergence angle:

$$p = d/(2\sin\alpha)$$

where g is the gap between the two similar Ronchi gratings G1 and G2, and is one of Talbot distances.

$$g = n(d^2/\lambda)$$

where n=0, 1, 2, . . .
Therefore, $$\tan\Delta\theta = (2h\tan\alpha)/g$$

Then, the object distance can be calculated using:

$$r = D/(2\tan\Delta\theta) = Dg/(4h\tan\alpha)$$

where r=object distance and D is the diameter of the detection system of the detector. Referring to FIG. 5, D essentially represents the first lens 6 aperture size. Here, the Moiré pattern happens to have same diameter D as the detection area of the detector is sufficient large to receive the entire image cast through the optical path. When incident beam converges or diverges, the fringe shifting causes a rotation of Moiré fringes with an angle:

$$\tan \phi = 2h/D$$

Therefore, $$r = g/(2 \tan \phi \tan \alpha)$$

where $\phi$=angle of rotation of Moiré fringes and $\alpha$=relative angle of incline of the pair of gratings.

Figure 11:
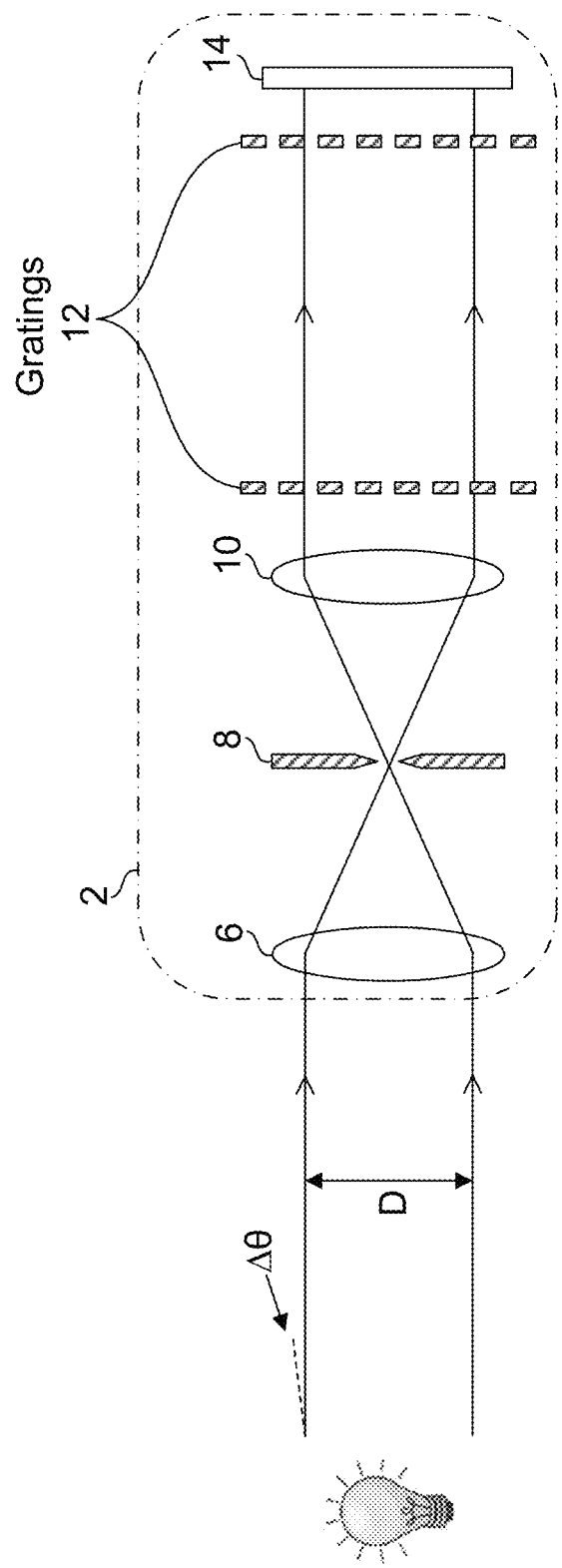
FIG. 11 is a side view of a system useful for measuring real distances of a DUT.
Figure 12:
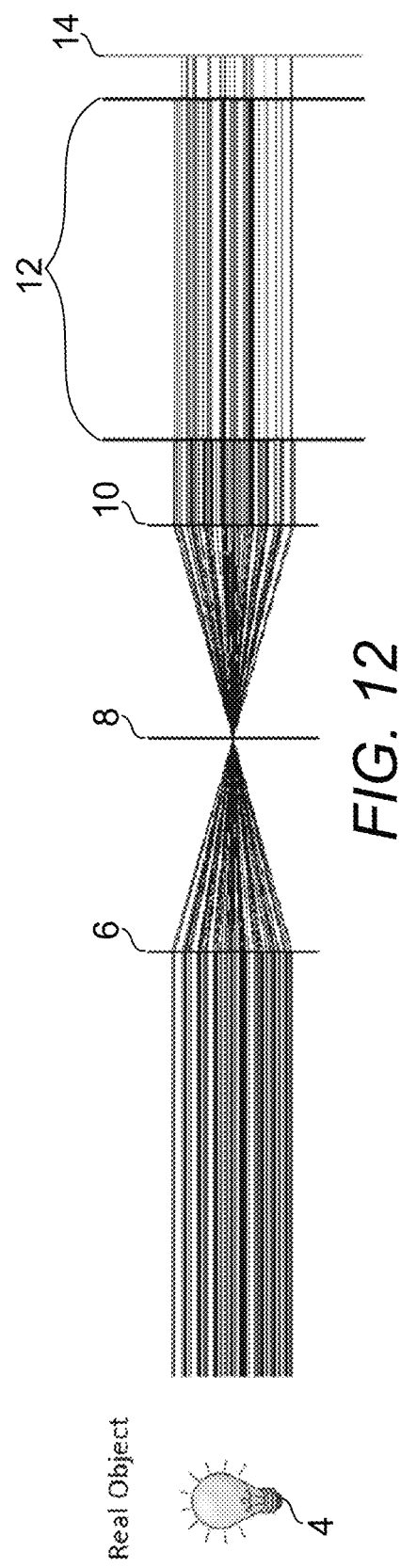
FIG. 12 is a side view of a simulation of a system useful for measuring real distances of a DUT.
Figure 13:
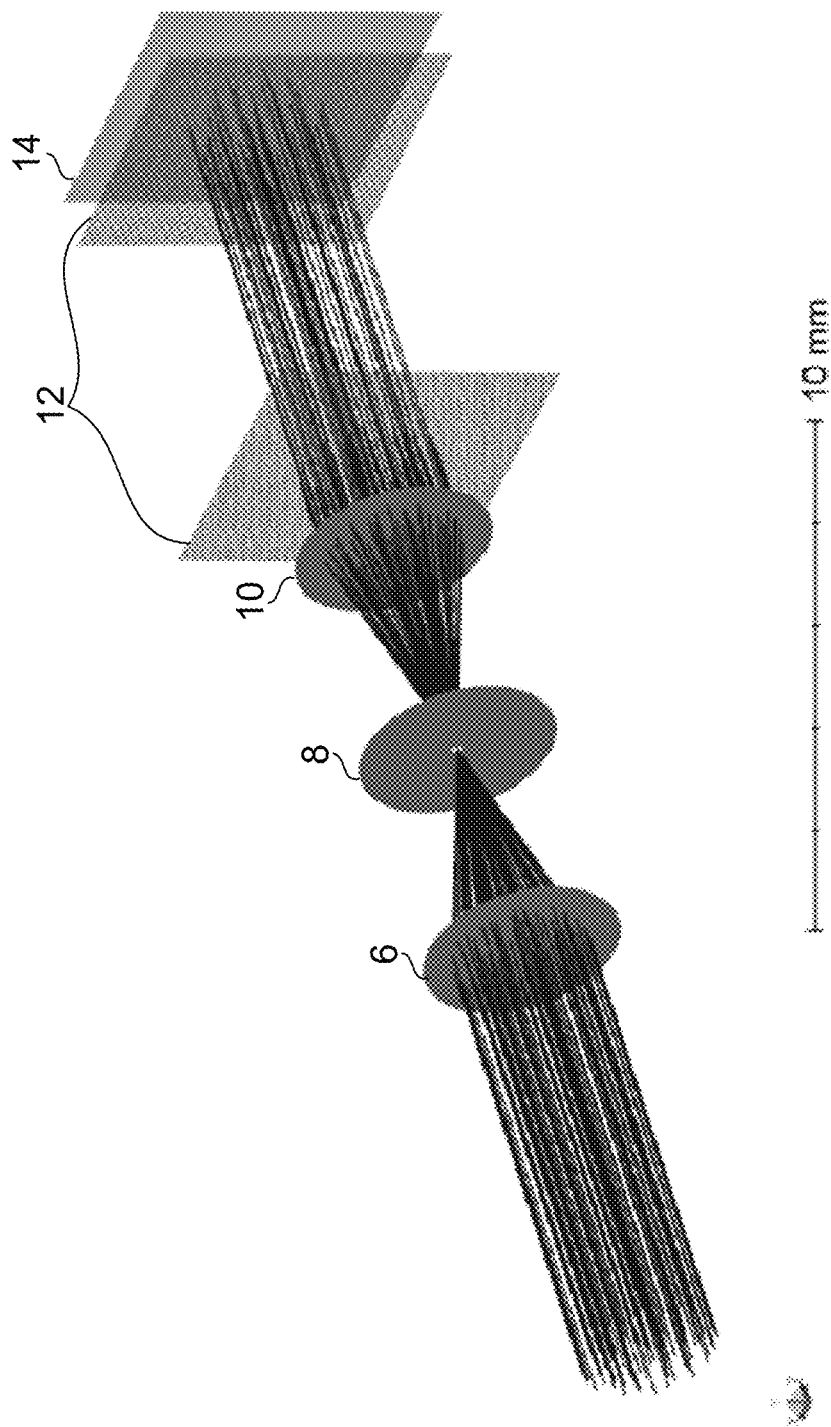
FIG. 13 is a top perspective view of a simulation of a system useful for measuring real distances of a DUT.

FIG. 11 is a side view of a system useful for measuring real distances of a DUT. FIG. is a side view of a simulation of a system useful for measuring real distances of a DUT. FIG. 13 is a top perspective view of a simulation of a system useful for measuring real distances of a DUT. Moiré deflectometry is used to provide a quantitative measure of the transverse wavefront change of an incident beam. Again, a pair of transmission gratings are placed at a distance from each other. A geometric shadow of the first grating is projected upon the second grating, forming a Moiré pattern. Angular deviations in the original beam produce shifts in the Moiré pattern. Displacements produced in the Moiré pattern gives information about the incident angle. The present system can be used to detect the distance from a real object such as a point light source as shown, based on the incident angle due to beam wavefront deformation. A pinhole 8 is placed at the Fourier plane to block light rays from other directions, which can enhance the fringe contrast. As shown herein, an object distance, e.g., a real object distance, can be resolved as D/(2 tan Δθ) where D is the diameter of the detection system of the detector and Δθ is the beam divergence angle.

Figure 14:
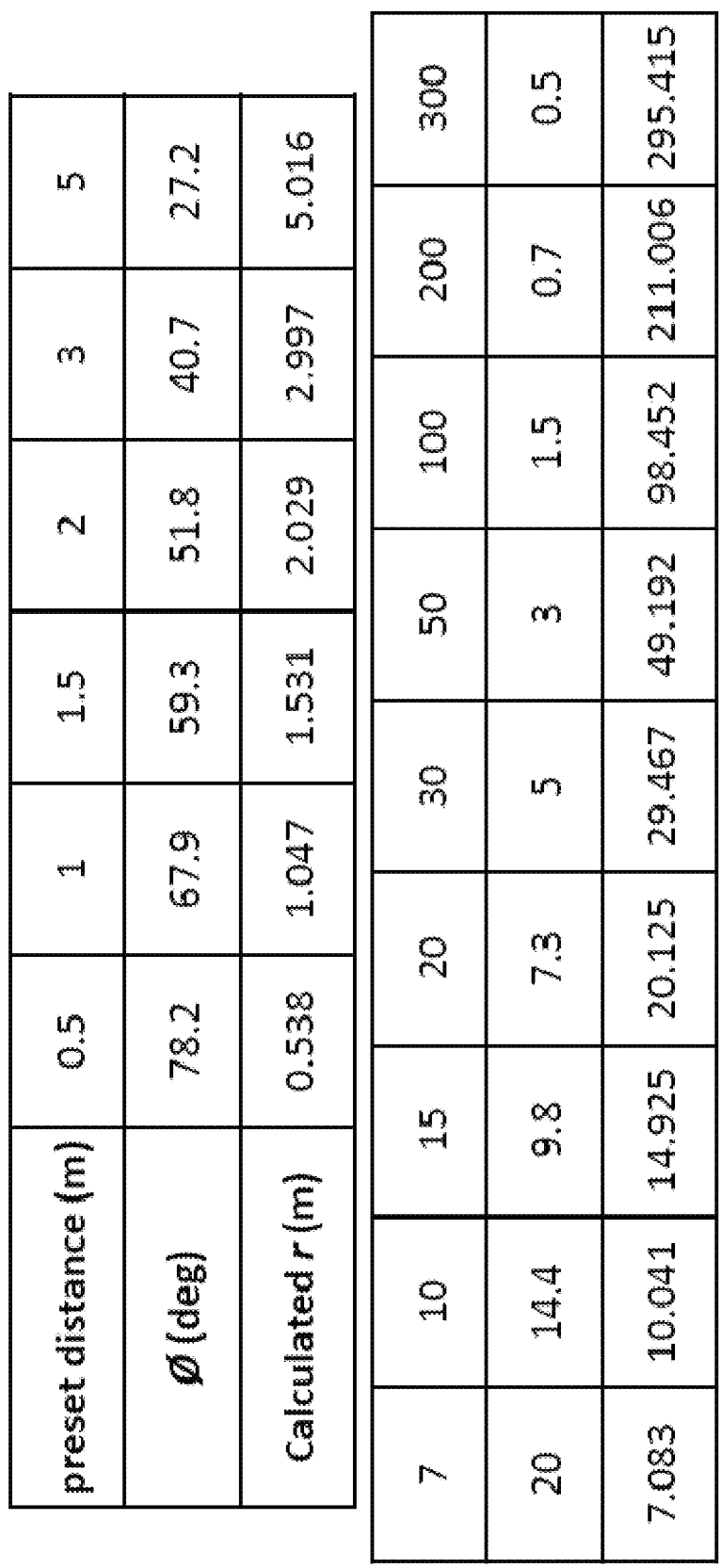
FIG. 14 is a table depicting correlating preset object distances, Moiré fringe rotation angles $\phi$ and simulated object distances or r values.
Figure 15:
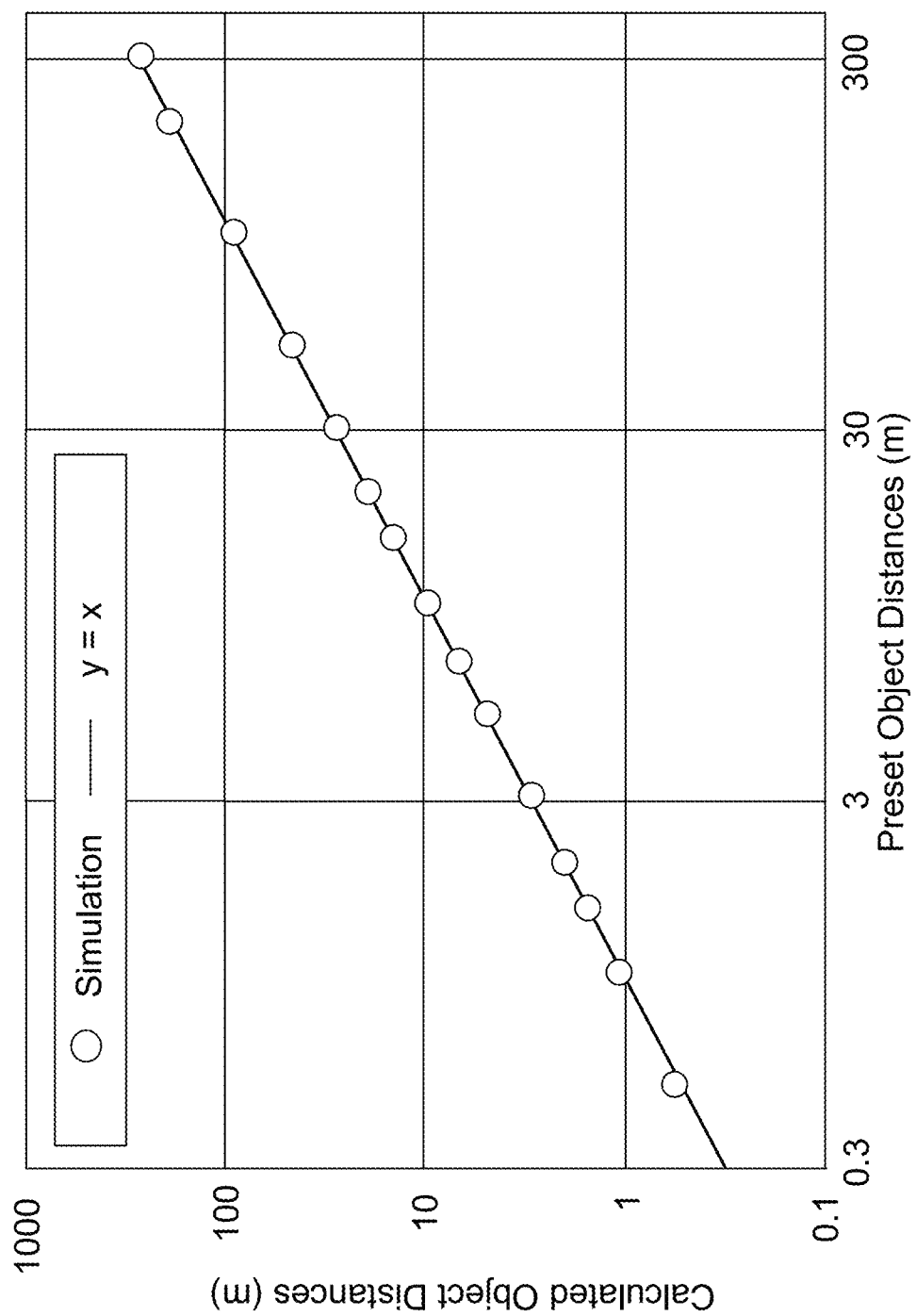
FIG. 15 is a diagram depicting simulated object distances or r values with respect to preset object distances.
Figure 16:
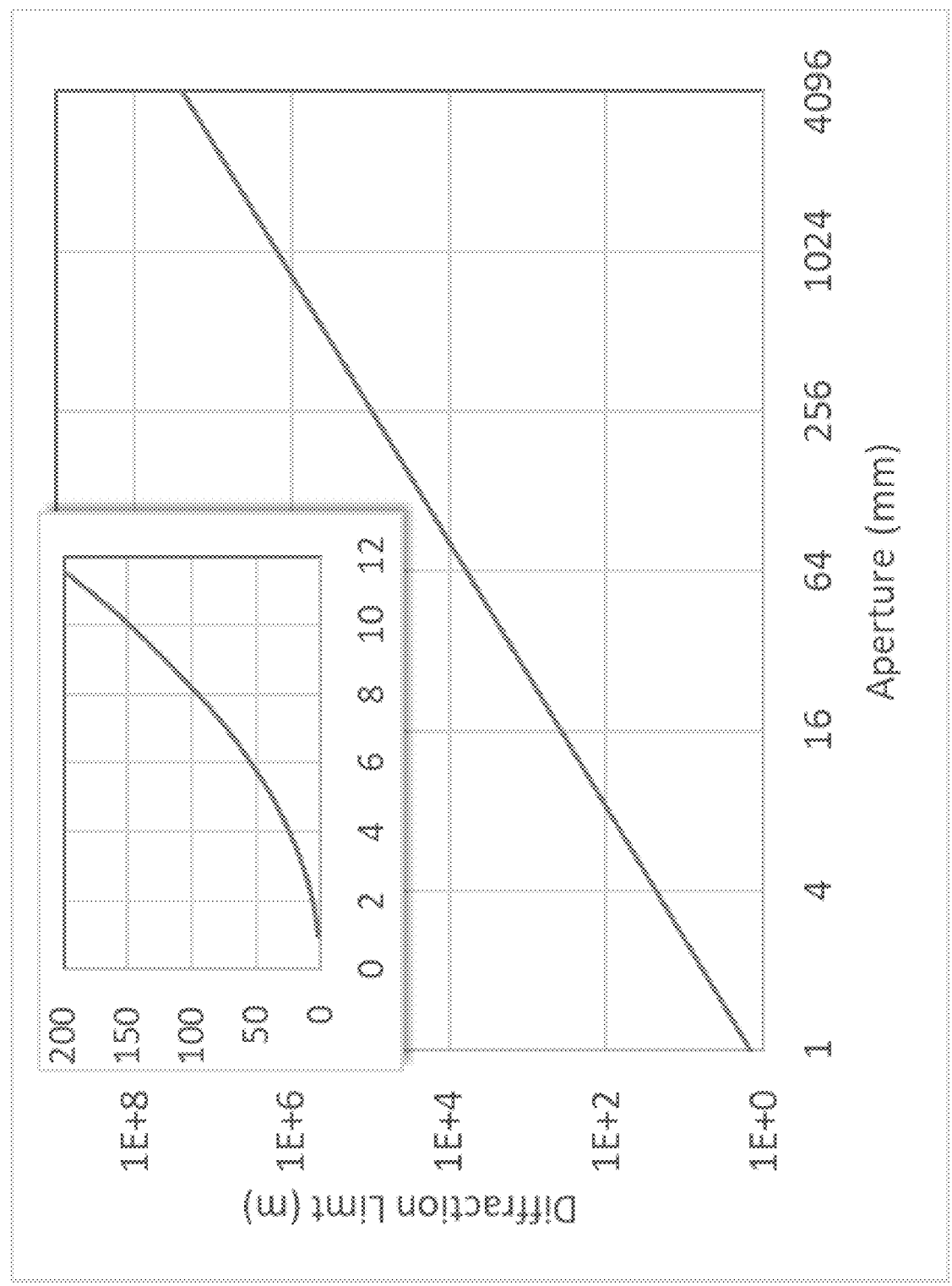
FIG. 16 is a chart depicting the diffraction limit with respect to the aperture size of an optical detection system of the detector.

FIG. 14 is a table depicting correlating preset object distances, Moiré fringe rotation angles $\phi$ and simulated object distances or r values. FIG. 15 is a diagram depicting simulated object distances or r values with respect to preset object distances. The accuracy of distance measurements highly depends on the angular deviation of the fringe alignment from that of perfect collimation which is 0 degrees (fringes of Moiré pattern are along vertical direction). At 300 m, the angular change becomes very small with the current set up. However, the physics law of diffraction limit will need to be considered in the measurements. A relatively larger aperture is required to measure a long object distance. FIG. 16 is a chart depicting the diffraction limit with respect to the size of an optical aperture. The minimum angular spread that can be resolved is shown as follows:

$$\delta\theta = 1.22(\lambda/D)$$

The object distance r can be resolved as follows:

$$r = D/(2 \tan(\delta\theta/2))$$

As $\delta\theta$ is small for a small aperture or a distant object, r is approximately:

$$r \approx D^2/(1.22\lambda)$$

As such, the actual detectable object distance will be limited by the diffraction. However, in many instances, the present Moiré-based technique is still much better than other methods in terms of the detection range and accuracy.

Figure 17:
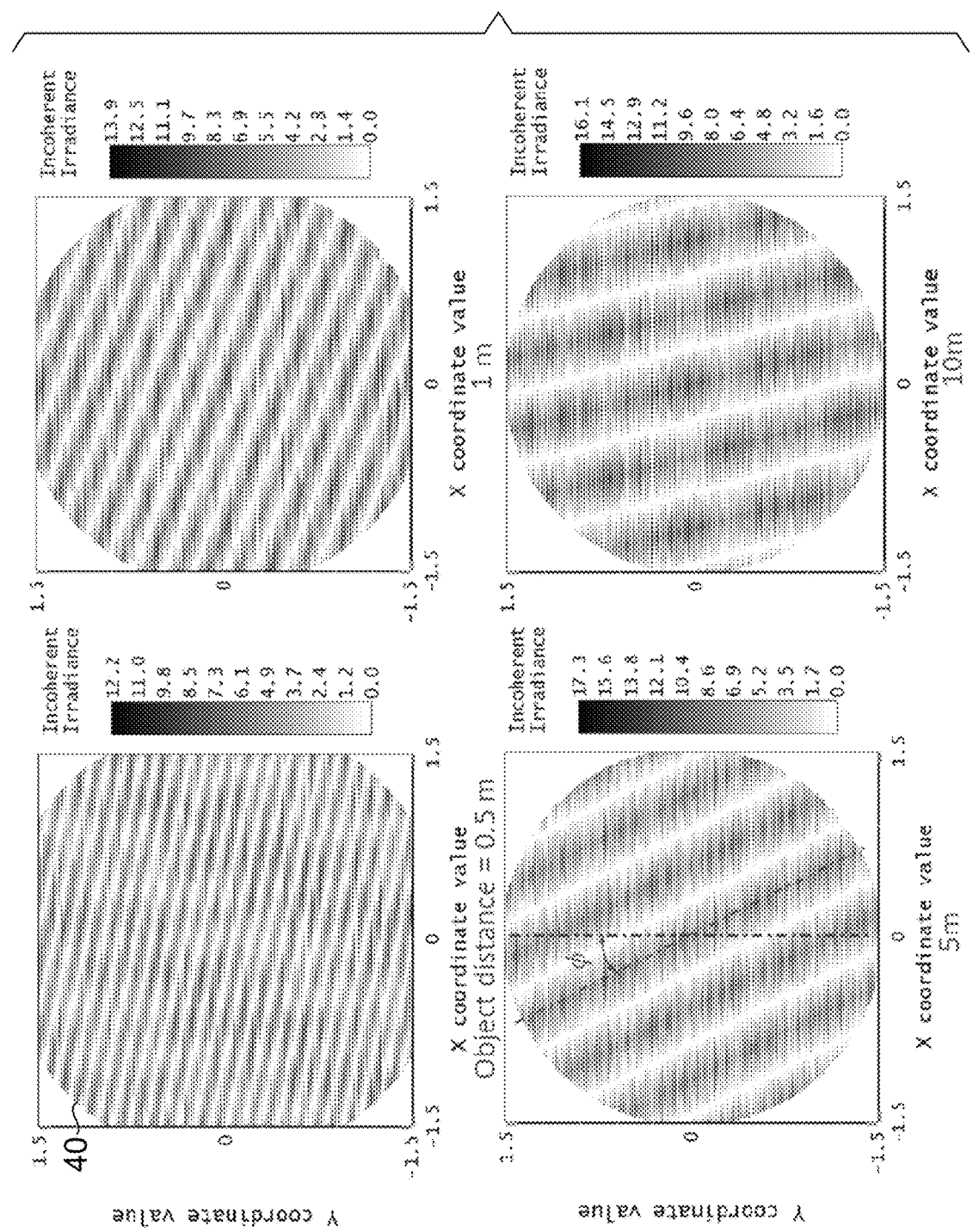
FIG. 17 are diagrams depicting simulated Moiré patterns obtained for various object distances.

FIG. 17 are diagrams depicting simulated Moiré patterns obtained for various object distances, e.g., using Zemax®. Unless otherwise specified, simulations were run using the non-sequential mode, analysis rays=1E+07, detector type of rectangle, data type of incoherent irradiance, optical aperture of 3 mm, wavelengths of 525 nm-575 nm and two Ronchi gratings of d=20 um, g=90 mm, $\alpha$=1 degree. It shall be noted that the angle of rotation of Moiré fringes $\phi$ differs for different object distances.

Figure 18:
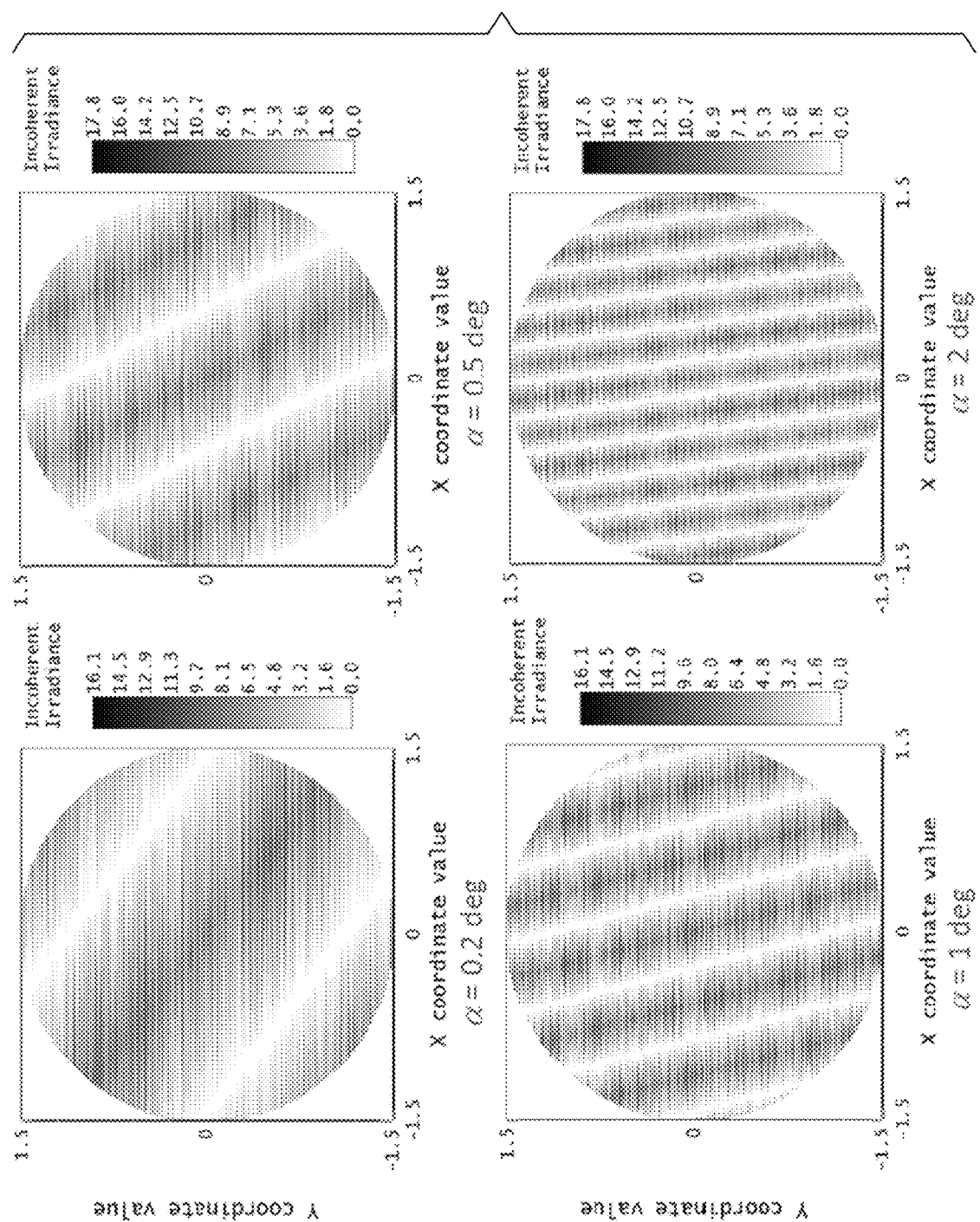
FIG. 18 are diagrams depicting simulated Moiré patterns obtained for gratings of various relatively inclined angles.

FIG. 18 are diagrams depicting simulated Moiré patterns obtained for gratings of various relative angles, i.e., with one grating disposed at various angles $\alpha$ with respect to the other grating. The object distance was set at 10 m. The two Ronchi gratings were disposed at d=20 um and g=90 mm. The results show that the sensitivity of Moiré deflectometry can be easily varied by changing the relative angle of incline of the pair of gratings $\alpha$.

Figure 19:
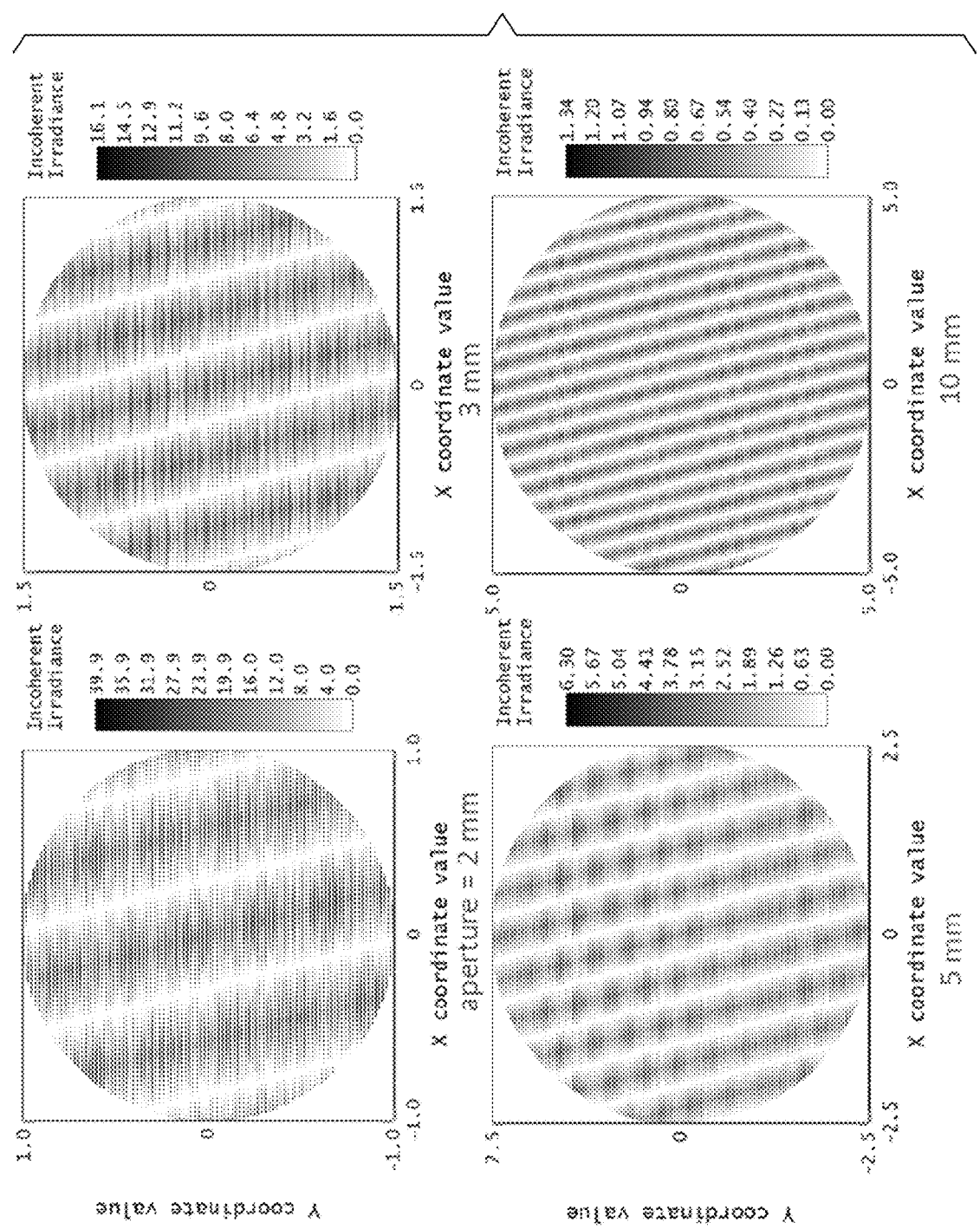
FIG. 19 are diagrams depicting simulated Moiré patterns obtained for optical apertures of various sizes.

FIG. 19 are diagrams depicting simulated Moiré patterns obtained for optical aperture of various sizes. The object distance was set at 10 m. The two Ronchi gratings were disposed at d=20 um, g=90 mm and $\alpha$=1 degree. It shall be noted that the Moiré patterns are disposed at the same rotation angle as the aperture decreases, e.g., the rotation angle of the Moiré patterns can be more precisely measured at a larger aperture.

Figure 20:
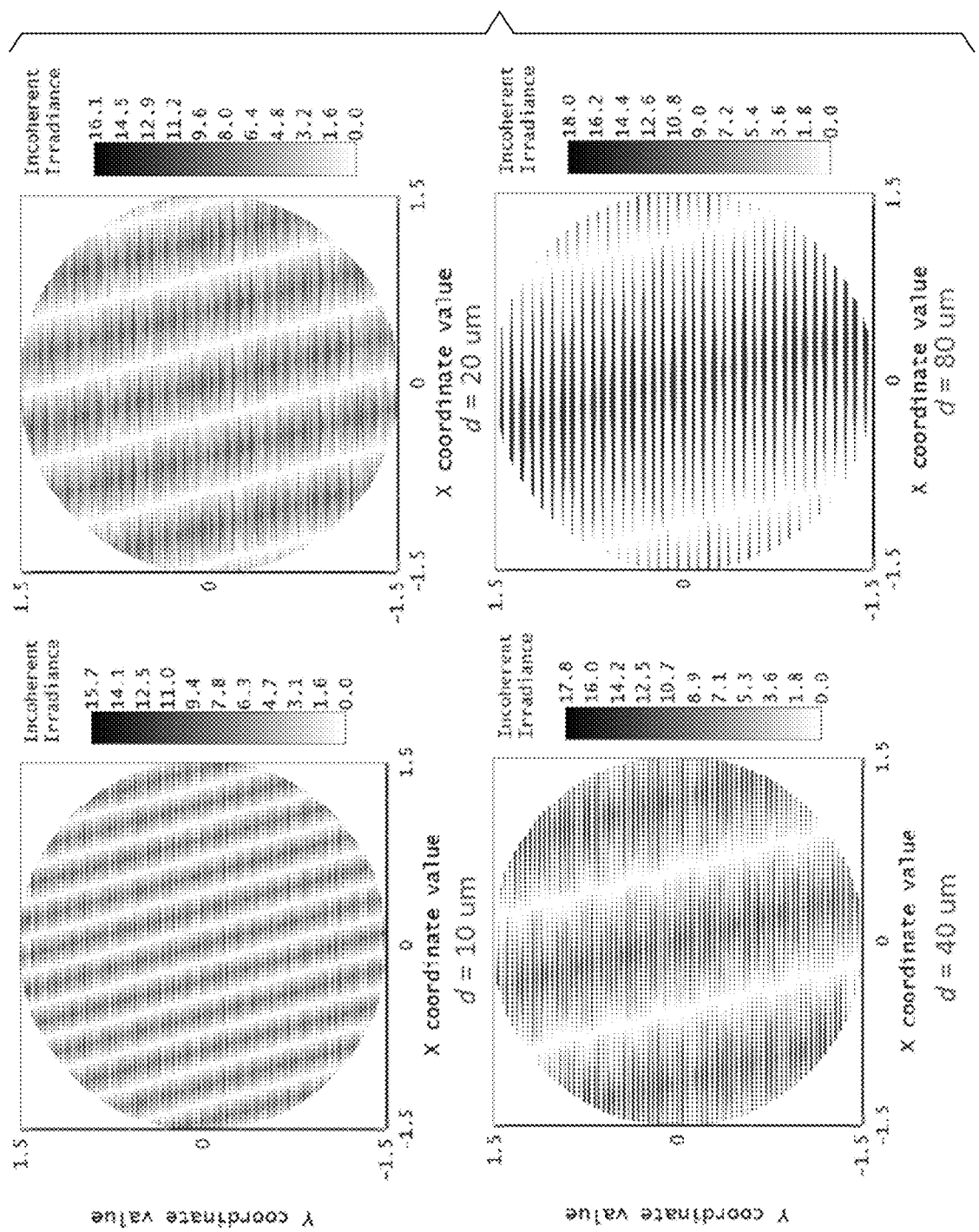
FIG. 20 are diagrams depicting simulated Moiré patterns obtained for gratings each disposed at various pitches of the gratings.

FIG. 20 are diagrams depicting simulated Moiré patterns obtained for gratings each disposed at various pitches d of the gratings. The object distance was set at 10 m. The two Ronchi gratings were disposed g=90 mm and $\alpha$=1 degree. It shall be noted that the Moiré patterns are disposed with more lines as d becomes larger, e.g., the rotation angle of the Moiré patterns can be more precisely measured at d=10 um compared to d=80 um.

Figure 21:
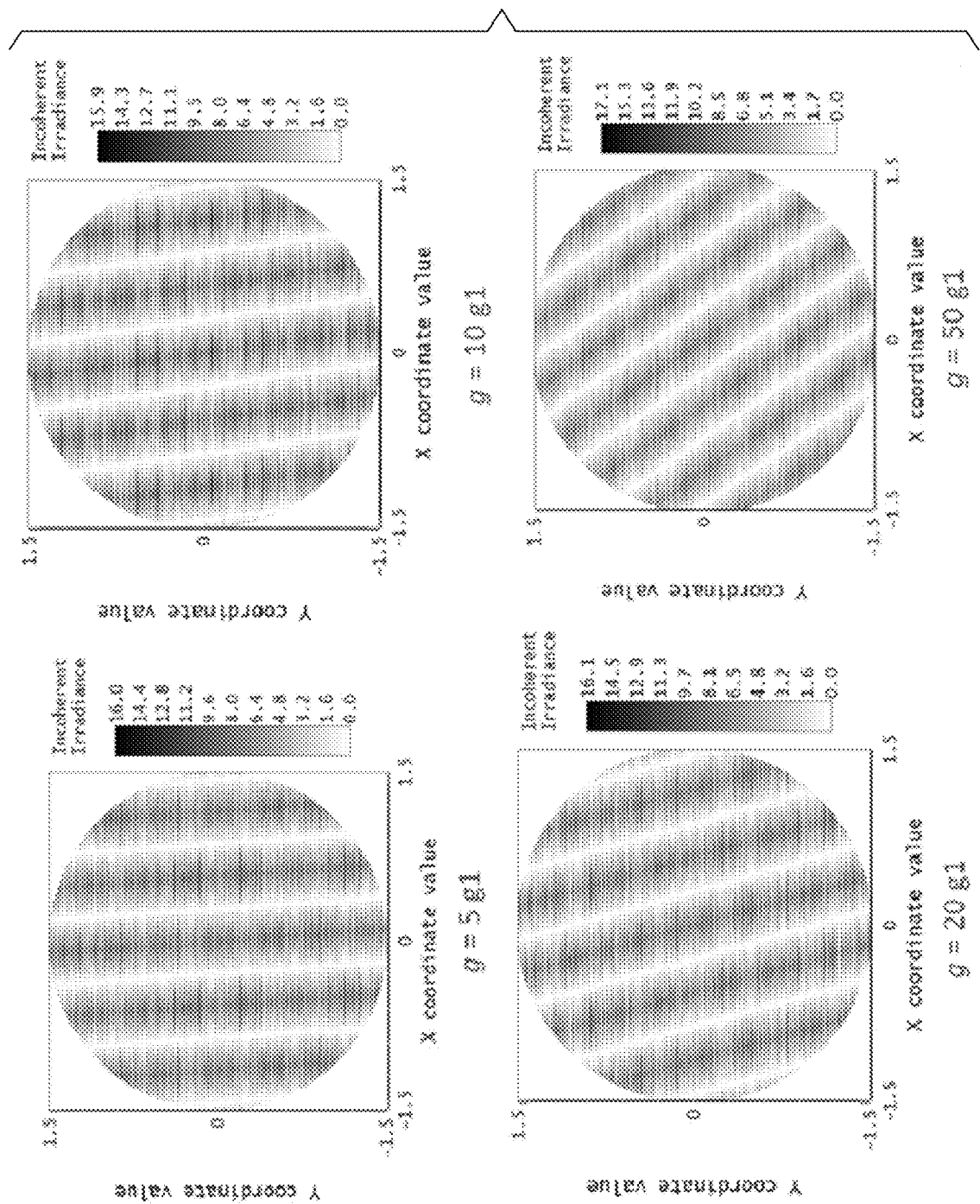
FIG. 21 are diagrams depicting simulated Moiré patterns obtained for an object distance of 1.5 meters with gratings disposed at various gaps.
Figure 22:
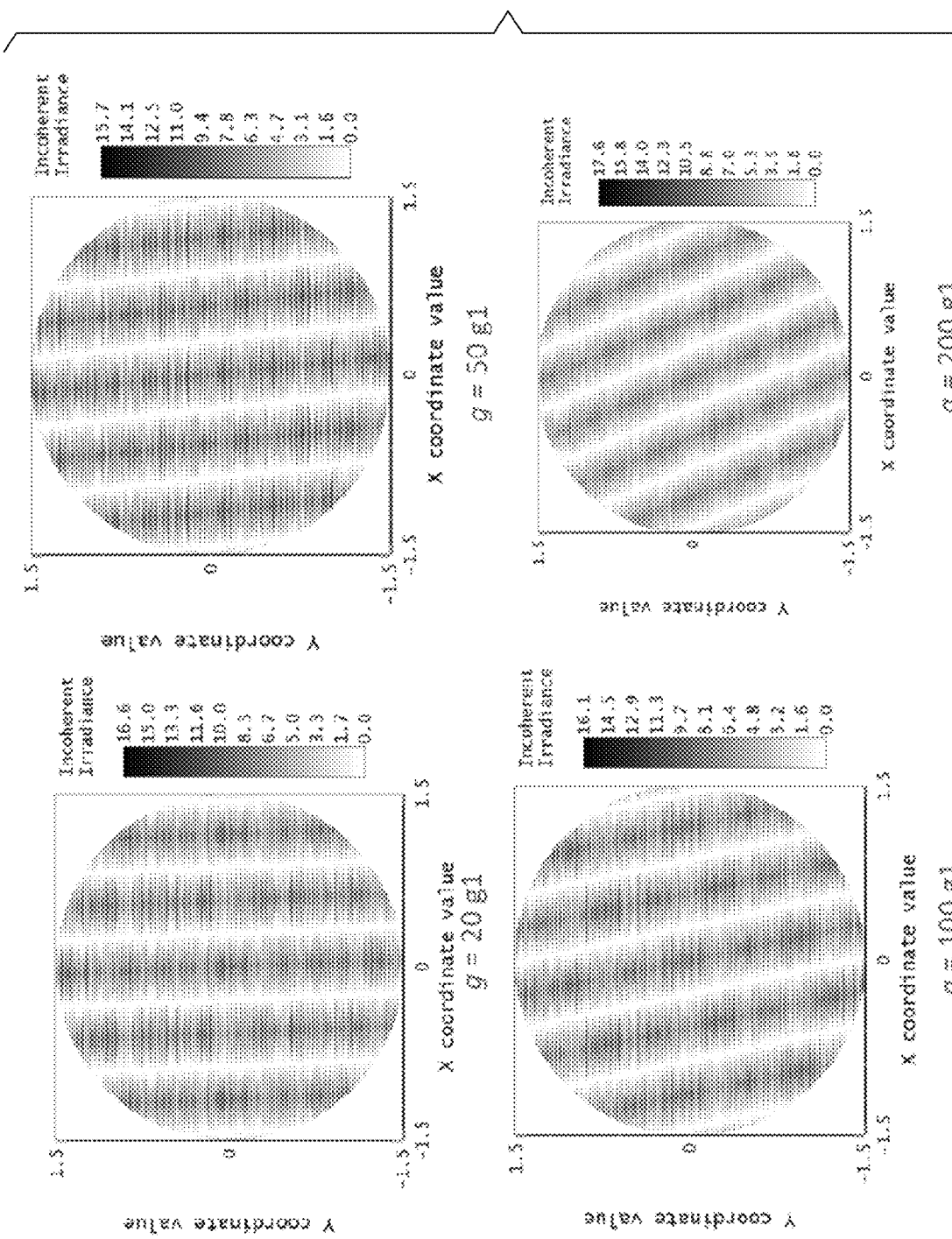
FIG. 22 are diagrams depicting simulated Moiré patterns obtained for an object distance of 10 meters with gratings disposed at various gaps.

FIG. 21 are diagrams depicting simulated Moiré patterns obtained for gratings disposed at various gaps g. The object distance was set at 1.5 m. The two Ronchi gratings were disposed d=20 um, $\alpha$=1 degree, g1=0.72727 mm, n=1 and $\lambda$=550 nm. FIG. 22 are diagrams depicting simulated Moiré patterns obtained for gratings disposed at various gaps g. The object distance was set at 10 m. The two Ronchi gratings were disposed d=20 um, $\alpha$=1 degree, g1=0.72727 mm, n=1 and $\lambda$=550 nm. It shall be noted that the rotation angle is much larger using a larger g than using a smaller g. As such, the large g can improve detection sensitivity.

Figure 24:
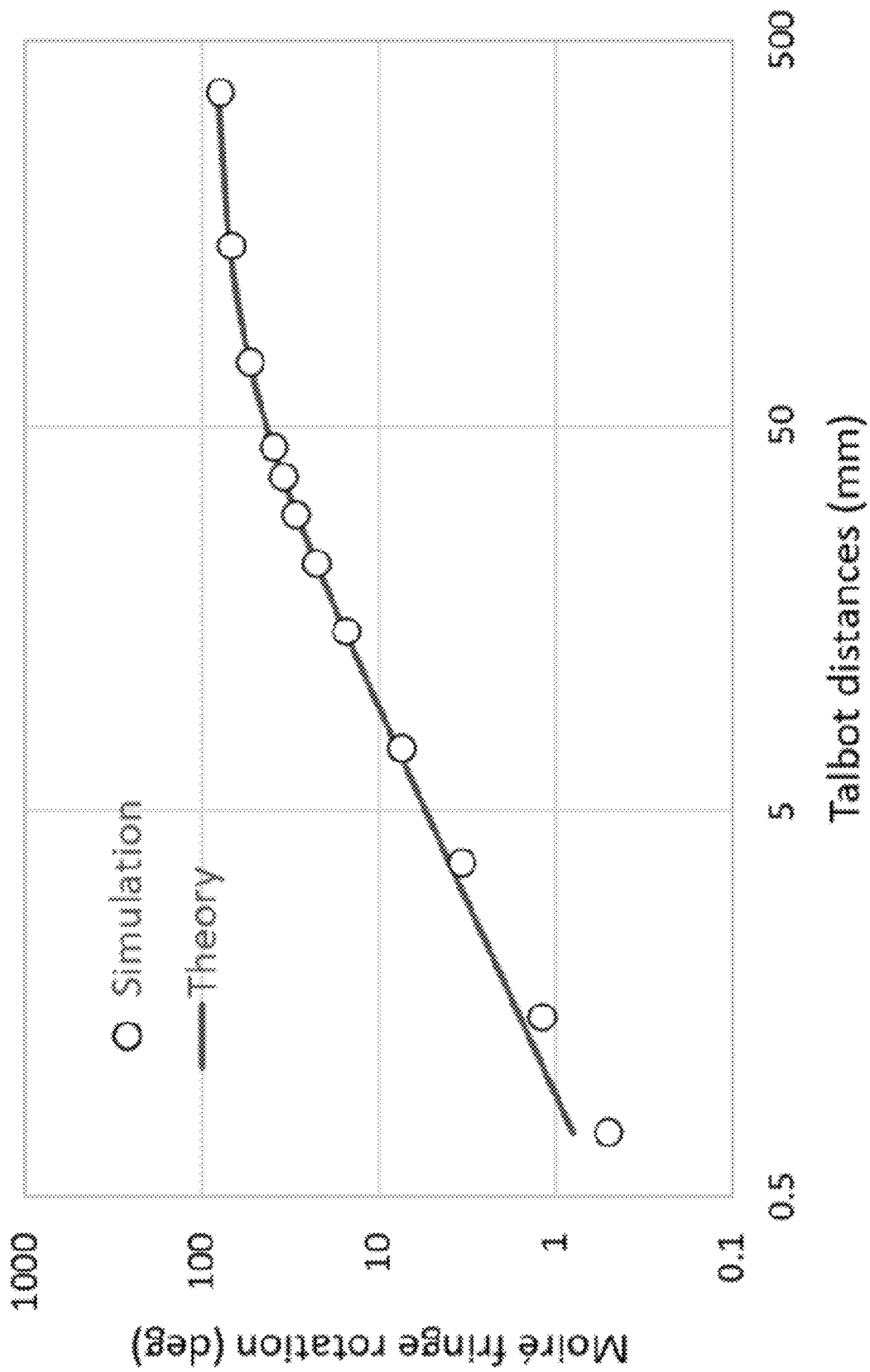
FIG. 24 is a diagram depicting simulated Moiré fringe rotation with respect to Talbot distances for an object distance of 1.5 m.

FIG. 23 is a table depicting correlating Talbot distances, gaps g between two gratings and Moiré fringe rotation angles $\phi$. FIG. 24 is a diagram depicting simulated Moiré fringe rotation with respect to Talbot distances. It shall be noted that the detection sensitivity is increased as Talbot distances increase. However, with a Talbot distance beyond about 100 mm, the sensitivity improvement becomes small. The object distance was set at 1.5 m. The two Ronchi gratings were disposed d=10 um, D=3 mm and $\alpha$=1 degree. The sensitivity of Moiré deflectometry can be easily varied by changing the separation between the gratings or rotation angles of the gratings, which is important for applications where the fringe shifts are too small or too great to be resolved by interferometry. The curve shown in the figure is simply calculated using equation:

$$\phi = a \tan(g/(2r \tan \alpha))$$

Figures 25, 26:
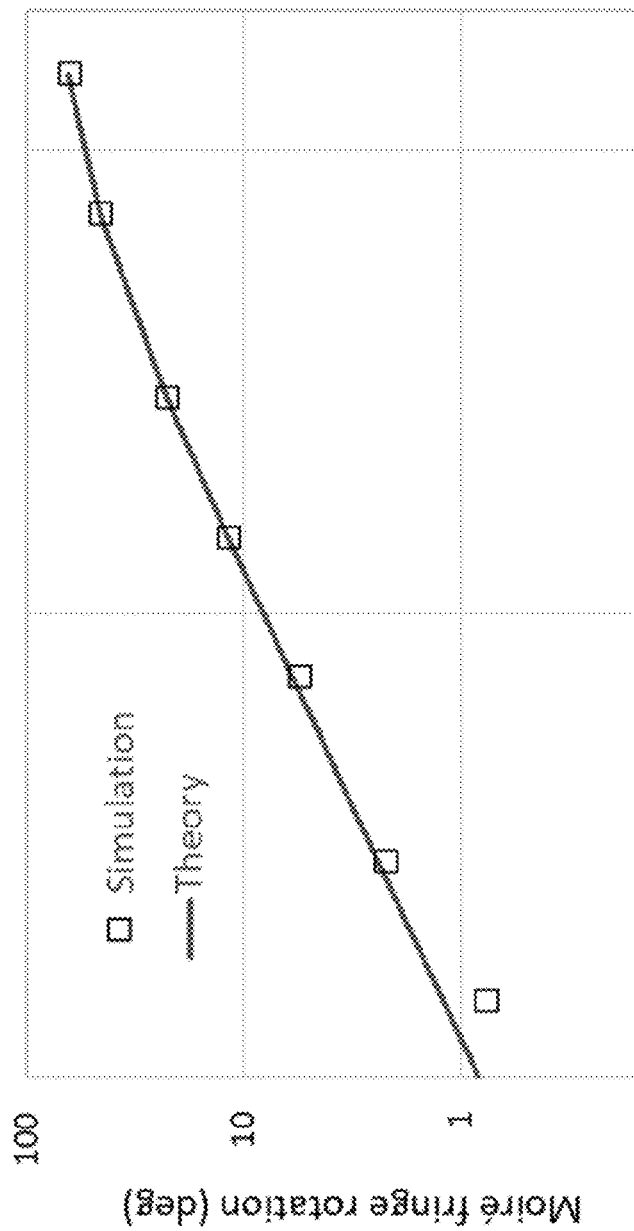
FIG. 25 is a table depicting correlating Talbot distances, gaps g between two gratings and Moiré fringe rotation angles ϕ where the object distance is 10 m.
FIG. 26 is a diagram depicting simulated Moiré fringe rotation with respect to Talbot distances for an object distance of 10 m.

FIG. 25 is a table depicting correlating Talbot distances, gaps g between two gratings and Moiré fringe rotation angles $\phi$ where the object distance was set at 10 m. FIG. 26 is a diagram depicting simulated Moiré fringe rotation with respect to Talbot distances. The two Ronchi gratings were disposed d=10 um, D=3 mm and $\alpha$=1 degree. Referring to FIGS. 23-26, it shall be noted that the curves start to plateau at a Talbot distance of about 90-100 mm for the object distance of 1.5 m and about 500 mm for the object distance of 10 m, i.e., Moiré fringe rotation increases proportionally at around a constant rate until a Talbot distance larger than about 100 mm (for 1.5 m object distance) or about 500 mm (for 10 m object distance). The Talbot distance should be set based on the sensitivity requirements. For high sensitivity, one can set the Talbot distance near the plateau or set the rotation angle α as small as possible.

Figure 27:
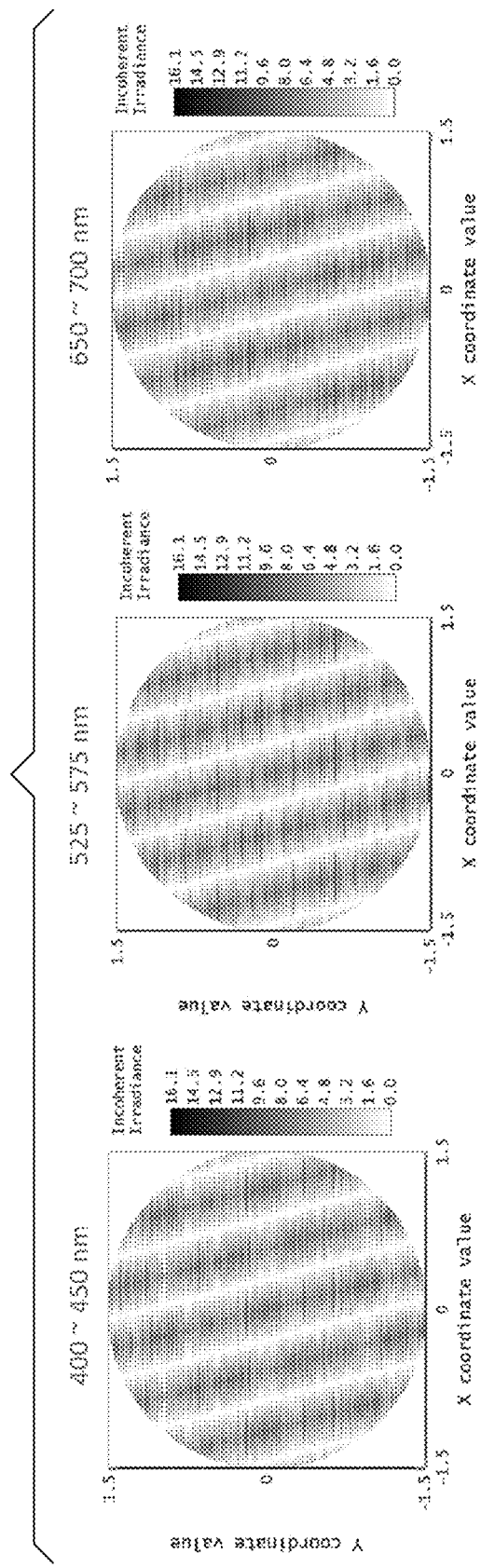
FIG. 27 are diagrams depicting simulated Moiré patterns of various wavelengths from an object.

FIG. 27 are diagrams depicting simulated Moiré patterns of various wavelengths of a light source of a DUT. Moiré patterns were obtained at a light source of a DUT disposed at different wavelengths, e.g., about 400~450 nm, 525~575 nm and 650~700 nm. The object distance was set at 10 m. The two Ronchi gratings were disposed d=20 um, g=90 mm and α=1 degree. It shall be noted that, unlike interferometry, the present Moiré-based methods are not sensitive to wavelengths. Therefore, a light source of a DUT which functions with the present method and system can be both a narrow band or a broad band incoherent light.

Figure 28:
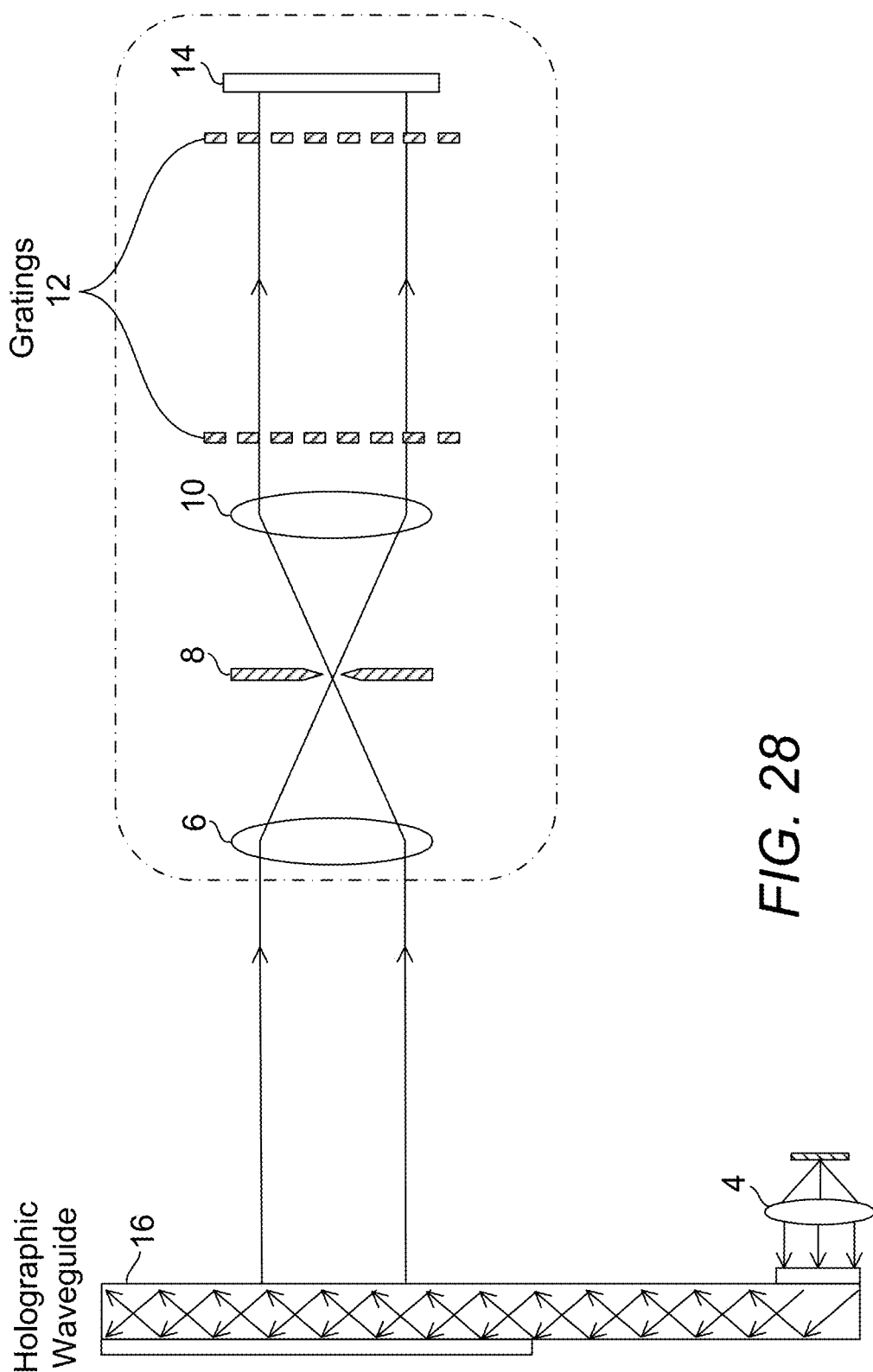
FIG. 28 is a diagram depicting one example application of the present system for measuring VDs.

FIG. 28 is a diagram depicting one example application of the present system for measuring VDs. In this example, the DUT is a holographic waveguide 16 coupled to a display panel module or light engine. In XR applications, holographic waveguides are critical components where the VDs must be properly determined to ensure that these optical components in the optical path of the XR systems are disposed accurately. Similar to the display panel modules, e.g., microdisplay panel modules, VD measurements are also important for holographic waveguides. The waveguide parallelism and related optical alignment are critical and required to be evaluated during the manufacturing stage and assembling process of the holographic waveguides.

Figure 29:
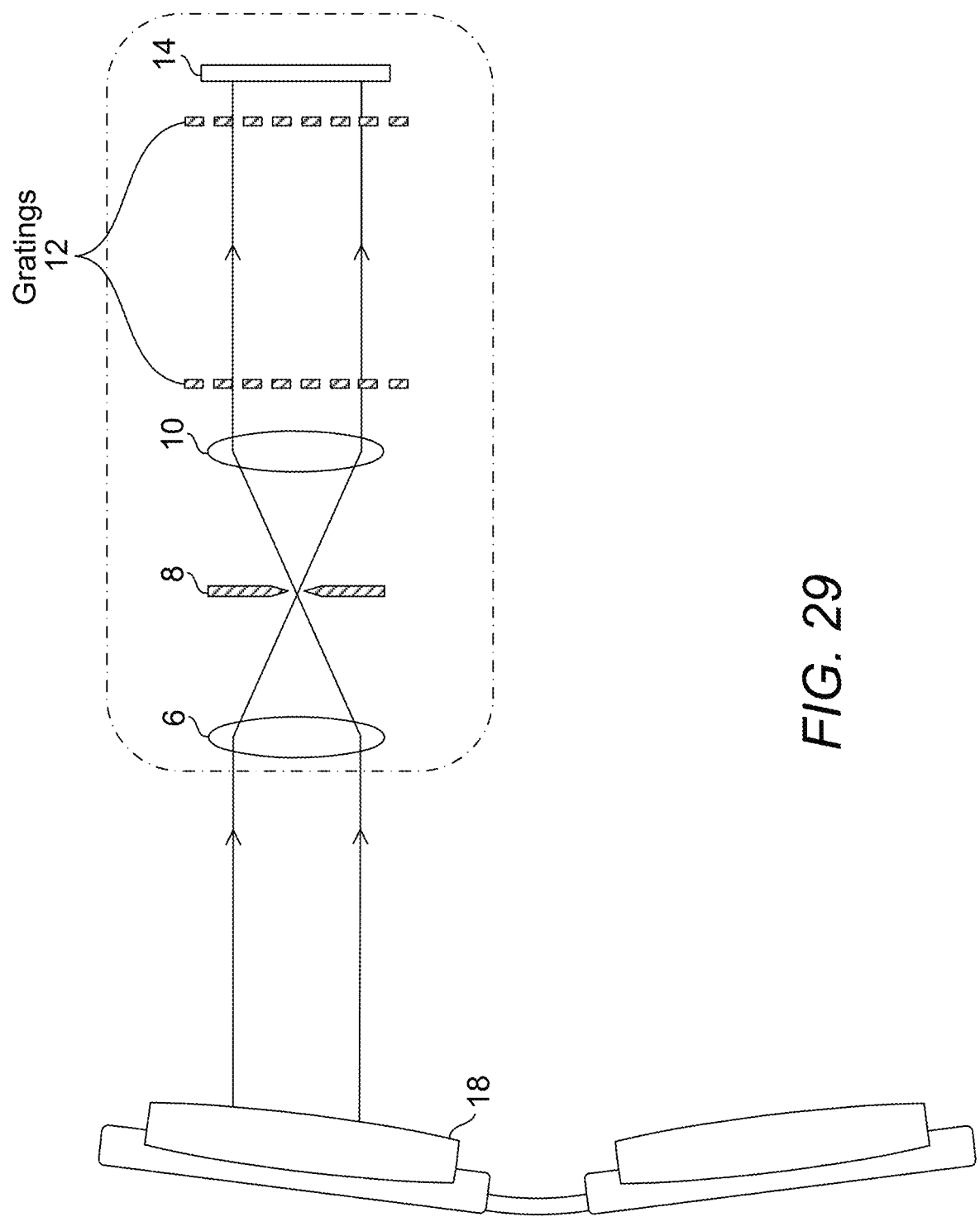
FIG. 29 is a diagram depicting another example application of the present system for measuring VDs.

FIG. 29 is a diagram depicting another example application of the present system for measuring VDs. In this example, the DUT is an XR glass 18. The VD accuracy is critically important in XR because it plays a crucial role in consistently creating a sense of immersion and presence in both virtual environment and actual surroundings. VD measurements provide the final assessment for XR glasses and systems, allowing for the accurate placement of virtual objects to create a sense of VD which is the perception of distance between two objects or locations in a virtual or augmented environment. If the VD is too far or too close, it can break the illusion of the augmented scene and make it difficult for the user to interact with a virtual object in a natural way. If the VD is incorrect, it can cause discomfort or even motion sickness in the user and break the sense of immersion in the virtual environment. Other examples of DUT include, but not limited to, a light engine, a near-eye display (NED), a holographic projector, a head-up display (HUD), a naked eye 3D TV or any device producing VDs and virtual images.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A system for providing an object distance of a device under test (DUT), said system comprising:
   (a) a first lens;
   (b) a second lens,
   (c) an optical pinhole disposed between the first lens and the second lens;
   (d) a detector; and
   (e) a pair of gratings disposed between the second lens and the detector, the detector configured for receiving a Moiré pattern formed as a result of light from the DUT being disposed through the first lens, the optical pinhole, the second lens and said pair of gratings,
   wherein the object distance is determined based on said Moiré pattern and one or more properties of said pair of gratings.

2. The system of claim 1, wherein the pair of gratings is a pair of Ronchi gratings.

3. The system of claim 1, wherein said one or more properties of said pair of gratings comprise a fringe shift (h), a gap (g) between said pair of gratings, a perpendicular displacement (p) of the pair of gratings to one another, a pitch (d) of said pair of gratings and a relative angle of incline (α) of said pair of gratings.

4. The system of claim 1, wherein the object distance is a distance selected from the group consisting of a real object distance and a virtual distance (VD).

5. The system of claim 4, wherein said real object distance is determined according to formula $D/(2 \tan \Delta\theta)$, wherein D=the diameter of the Moiré pattern and $\Delta\theta$=beam divergence angle.

6. The system of claim 1, wherein said object distance is determined according to formula $r=g/(2 \tan \phi \tan \alpha)$, wherein r=object distance, φ=angle of rotation of Moiré fringes, α=relative angle of incline of the pair of gratings and g=gap between the pair of gratings.

7. The system of claim 1, wherein the DUT is a device selected from the group consisting of a display panel module, a light engine, a near-eye display (NED), a holographic waveguide, a holographic projector, a head-up display (HUD), a naked eye 3D TV, an Extended Reality (XR) glass and a device producing VDs and virtual images.

8. A system for providing an object distance of a device under test (DUT), said system comprising:
   (a) a first lens;
   (b) a second lens,
   (c) an optical pinhole disposed between the first lens and the second lens;
   (d) a detector; and
   (e) a pair of gratings disposed between the second lens and the detector, the detector configured for receiving a Moiré pattern formed as a result of light from the DUT being disposed through the first lens, the optical pinhole, the second lens and said pair of gratings, wherein the object distance is determined based on said Moiré pattern and one or more properties of said pair of gratings comprising a fringe shift (h), a gap (g) between said pair of gratings, a perpendicular displacement (p) of the pair of gratings to one another, a pitch (d) of said pair of gratings and a relative angle of incline ($\alpha$) of said pair of gratings.

9. The system of claim 8, wherein the pair of gratings is a pair of Ronchi gratings.

10. The system of claim 8, wherein the object distance is a distance selected from the group consisting of a real object distance and a virtual distance (VD).

11. The system of claim 10, wherein said real object distance is determined according to formula $D/(2 \tan \Delta\theta)$, wherein D=the diameter of the Moiré pattern and $\Delta\theta$=beam divergence angle.

12. The system of claim 8, wherein said object distance is determined according to formula $r=g/(2 \tan \phi \tan \alpha)$, wherein r=object distance, $\phi$=angle of rotation of Moiré fringes, $\alpha$=relative angle of incline of the pair of gratings and g=gap between the pair of gratings.

13. The system of claim 8, wherein the DUT is a device selected from the group consisting of a display panel module, a light engine, a near-eye display (NED), a holographic waveguide, a holographic projector, a head-up display (HUD), a naked eye 3D TV, an Extended Reality (XR) glass and a device producing VDs and virtual images.

* * * * *